United States Patent
Amihood et al.

(10) Patent No.: US 10,845,477 B2
(45) Date of Patent: Nov. 24, 2020

(54) POWER MANAGEMENT USING A LOW-POWER RADAR

(71) Applicant: Google LLC, Mountain View, CA (US)

(72) Inventors: Patrick M. Amihood, San Francisco, CA (US); Abhijit Shah, Foster City, CA (US); Jaime Lien, Mountain View, CA (US); Hakim Kader Bhai Raja, San Francisco, CA (US)

(73) Assignee: Google LLC, Mountain View, CA (US)

( * ) Notice: Subject to any disclaimer, the term of this patent is extended or adjusted under 35 U.S.C. 154(b) by 211 days.

(21) Appl. No.: 15/974,528

(22) Filed: May 8, 2018

(65) Prior Publication Data

US 2018/0329050 A1 Nov. 15, 2018

Related U.S. Application Data

(60) Provisional application No. 62/504,462, filed on May 10, 2017.

(51) Int. Cl.
*G01S 13/88* (2006.01)
*H04W 52/02* (2009.01)
(Continued)

(52) U.S. Cl.
CPC .............. *G01S 13/88* (2013.01); *G01S 7/021* (2013.01); *G01S 7/4008* (2013.01); *G01S 13/04* (2013.01);
(Continued)

(58) Field of Classification Search
CPC ...... G01S 13/88; G01S 13/582; G01S 7/4008; G01S 7/021; G01S 13/18; G01S 13/04;
(Continued)

(56) References Cited

U.S. PATENT DOCUMENTS

| | | |
|---|---|---|
| 4,843,351 A | 6/1989 | Edwards et al. |
| 4,912,477 A | 3/1990 | Lory et al. |

(Continued)

FOREIGN PATENT DOCUMENTS

| | | |
|---|---|---|
| CN | 101354438 | 1/2009 |
| EP | 1548461 | 6/2005 |

(Continued)

OTHER PUBLICATIONS

Pursuant to MPEP § 2001.6(b) the applicant brings the following co-pending application to the Examiner's attention: U.S. Appl. No. 15/974,502.

(Continued)

*Primary Examiner* — Frank J McGue
(74) *Attorney, Agent, or Firm* — Colby Nipper PLLC

(57) ABSTRACT

Techniques and apparatuses are described that enable power management using a low-power radar. The described techniques enable a radar system to reduce overall power consumption, thereby facilitating incorporation and utilization of the radar system within power-limited devices. In one aspect, the radar system can replace other power-hungry sensors and provide improved performance in the presence of different environmental conditions, such as low lighting, motion, or overlapping targets. In another aspect, the radar system can cause other components within the electronic device to switch to an off-state based on detected activity in an external environment. By actively switching the components between an on-state or the off-state, the radar system enables the computing device to respond to changes in the external environment without the use of an automatic shut-off timer or a physical touch or verbal command from a user.

20 Claims, 14 Drawing Sheets

(51) Int. Cl.

| | | |
|---|---|---|
| *G01S 13/04* | (2006.01) | |
| *G01S 13/18* | (2006.01) | |
| *G01S 13/58* | (2006.01) | |
| *G01S 7/02* | (2006.01) | |
| *G01S 7/40* | (2006.01) | |
| *G01S 7/41* | (2006.01) | |
| *G01S 13/56* | (2006.01) | |

(52) U.S. Cl.
  CPC ............ *G01S 13/18* (2013.01); *G01S 13/582* (2013.01); *H04W 52/0219* (2013.01); *G01S 7/411* (2013.01); *G01S 7/415* (2013.01); *G01S 13/56* (2013.01); *G01S 2007/4013* (2013.01)

(58) Field of Classification Search
  CPC .......... G01S 7/411; G01S 13/56; G01S 7/415; G01S 2007/4013; H04W 52/0219
  USPC ......................................................... 342/118
  See application file for complete search history.

(56) References Cited

U.S. PATENT DOCUMENTS

| | | |
|---|---|---|
| 6,633,254 B1 | 10/2003 | Sutphin |
| 6,671,496 B1 | 12/2003 | Hoshi |
| 7,092,690 B2 | 8/2006 | Zancewicz |
| 7,142,829 B2 | 11/2006 | Sung et al. |
| 8,798,695 B1 | 8/2014 | Zheng et al. |
| 9,086,476 B1 | 7/2015 | Schuss et al. |
| 9,689,967 B1 | 6/2017 | Stark et al. |
| 10,247,809 B2 | 4/2019 | Testar et al. |
| 10,754,005 B2 | 8/2020 | Lien et al. |
| 10,782,390 B2 | 9/2020 | Lien et al. |
| 10,795,009 | 10/2020 | Lien et al. |
| 2003/0179138 A1 | 9/2003 | Chen |
| 2007/0200747 A1 | 8/2007 | Okai et al. |
| 2008/0204322 A1 | 8/2008 | Oswald et al. |
| 2009/0180466 A1 | 7/2009 | Soul et al. |
| 2009/0323815 A1 | 12/2009 | Baker et al. |
| 2010/0245091 A1 | 9/2010 | Margon |
| 2011/0074621 A1 | 3/2011 | Wintermantel |
| 2011/0140949 A1 | 6/2011 | Lee |
| 2011/0267958 A1 | 11/2011 | Sekiya et al. |
| 2012/0001802 A1 | 1/2012 | Grau Besoli et al. |
| 2012/0092205 A1 | 4/2012 | Bourdelais et al. |
| 2012/0146796 A1 | 6/2012 | Kenneth et al. |
| 2013/0069816 A1 | 3/2013 | Ash et al. |
| 2015/0198700 A1 | 7/2015 | Morita et al. |
| 2016/0054436 A1* | 2/2016 | Lee .......................... G01S 13/04 345/211 |
| 2016/0103199 A1 | 4/2016 | Rappaport |
| 2016/0204929 A1 | 7/2016 | Shimizu et al. |
| 2016/0252607 A1* | 9/2016 | Saboo ...................... G01S 13/02 342/107 |
| 2017/0086202 A1 | 3/2017 | Chen |
| 2017/0090011 A1 | 3/2017 | West et al. |
| 2017/0097413 A1* | 4/2017 | Gillian ............... G06K 9/00201 |
| 2017/0201887 A1 | 7/2017 | Farshchian et al. |
| 2017/0307728 A1 | 10/2017 | Eshraghi et al. |
| 2017/0366242 A1 | 12/2017 | Lee et al. |
| 2018/0031673 A1 | 2/2018 | Kim et al. |
| 2018/0095161 A1 | 4/2018 | Kellum et al. |
| 2018/0329049 A1 | 11/2018 | Amihood et al. |
| 2018/0348339 A1 | 12/2018 | Lien et al. |
| 2018/0348340 A1 | 12/2018 | Lien et al. |
| 2018/0348353 A1 | 12/2018 | Lien et al. |
| 2019/0120954 A1 | 4/2019 | Kim et al. |

FOREIGN PATENT DOCUMENTS

| | | |
|---|---|---|
| EP | 1775600 | 4/2007 |
| EP | 3073574 | 9/2016 |
| TW | I287367 | 7/2006 |
| WO | 9723063 | 6/1997 |
| WO | 2014094928 | 9/2004 |
| WO | WO-2014094928 A1 * | 6/2014 ........... G01S 7/4008 |
| WO | 2015184406 | 12/2015 |
| WO | 2017044038 | 3/2017 |
| WO | 2018222266 | 12/2018 |
| WO | 2018222267 | 12/2018 |
| WO | 2018222268 | 12/2018 |

OTHER PUBLICATIONS

"EP Appeal Decision", European Application No. 10194359.5, dated May 28, 2019, 20 pages.
"Galaxy S4 Air Gesture", Galaxy S4 Guides, https://allaboutgalaxys4.com/galaxy-s4-features-explained/air-gesture/, 4 pages.
"Samsung Galaxy S4 Air Gestures", Video from https://www.youtube.com/watch?v=375Hb87yGcg, May 7, 2013.
"Foreign Office Action", Taiwanese Application No. 107107978, dated Jan. 15, 2019, 9 pages.
"Foreign Office Action", Taiwanese Application No. 107107979, dated Oct. 16, 2018, 9 pages.
"Foreign Office Action", Taiwanese Application No. 107107729, dated Feb. 18, 2019, 7 pages.
"Foreign Office Action", Taiwanese Application No. 107107979, dated Apr. 12, 2019, 3 pages.
"International Preliminary Report on Patentability", PCT Application No. PCT/US2018/025506, dated May 15, 2019, 15 pages.
"International Search Report", Application No. PCT/US2018/025506, dated Jul. 18, 2018, 4 pages.
"International Search Report", PCT Application No. PCT/US2018/025489, dated Jul. 18, 2018, 4 pages.
"International Search Report and Written Opinion", PCT Application No. PCT/US2018/025495, dated Jun. 28, 2018, 14 pages.
"Written Opinion", PCT Application No. PCT/US2018/025489, dated Jul. 18, 2018, 8 pages.
"Written Opinion", PCT Application No. PCT/US2018/025506, dated Jul. 18, 2018, 8 pages.
"Written Opinion of the International Preliminary Examining Authority", PCT Application No. PCT/US2018/025489, dated May 10, 2019, 7 pages.
Chen, et al., "Indoor Target Tracking Using High Doppler Resolution Passive Wi-Fi Radar", 2015 IEEE International Conference on Acoustics, Speech and Signal Processing (ICASSP), Apr. 1, 2015 (Apr. 1, 2015), pp. 5565-5569, XP055311663, DOI: 10.1109/ICASSP. 2015.7179036 ISBN: 978-1-4673-6997-8, Apr. 1, 2015, 5 pages.
Fan, et al., "Hand Gesture Recognition Based on Wi-Fi Chipsets", 2017 IEEE Radio and Wireless Symposium (RWS), Jan. 15, 2017 IEEE, pp. 98-100., 2017, 3 pages.
Lin, et al., "Study of Sub-6GHz Hybrid Beamforming Technology", ICT Journal No. 168, Dec. 29, 2016, 7 pages.
Tenglong, et al., "Hand Gesture Recognition Based on Wi-Fi Chipsets", 2017 IEEE Radio and Wireless Symposium , (RWS). IEEE, Jan. 15, 2017 (Jan. 15, 2017), pp. 98-100, XP033080528, DOI: 10.1109/RWS.2017.7885956, 3 pages.
"Foreign Office Action", Taiwanese Application No. 107115694, dated Dec. 21, 2018, 6 pages.
"International Search Report and Written Opinion", PCT Application No. PCT/US2018/031862, dated Jul. 26, 2018, 13 pages.
"International Preliminary Report on Patentability", PCT Application No. PCT/US2018/031862, dated Nov. 21, 2019, 12 pages.
"Non-Final Office Action", U.S. Appl. No. 15/928,386, dated Jan. 7, 2020, 14 Pages.
"Non-Final Office Action", U.S. Appl. No. 15/928,346, dated Jan. 10, 2020, 11 Pages.
"Non-Final Office Action", U.S. Appl. No. 15/928,273, dated Feb. 18, 2020, 11 Pages.
"Non-Final Office Action", U.S. Appl. No. 15/974,502, dated Feb. 18, 2020, 11 Pages.
"Notice of Allowance", U.S. Appl. No. 15/928,386, dated Apr. 21, 2020, 7 Pages.
"Extended European Search Report", EP Application No. 20170421.0, dated Jun. 9, 2020, 7 pages.
"Final Office Action", U.S. Appl. No. 15/974,502, dated Jun. 4, 2020, 13 Pages.

(56) References Cited

OTHER PUBLICATIONS

"Notice of Allowance", U.S. Appl. No. 15/928,346, dated May 18, 2020, 8 Pages.
"Notice of Allowance", U.S. Appl. No. 15/928,273, dated Jul. 15, 2020, 7 Pages.
"Notice of Allowance", U.S. Appl. No. 15/974,502, dated Aug. 12, 2020, 7 Pages.
"Corrected Notice of Allowance", U.S. Appl. No. 15/974,502, Sep. 30, 2020, 2 pages.
"Foreign Office Action", Taiwanese Application No. 107107979, Sep. 7, 2020, 12 pages.

* cited by examiner

POWER MANAGEMENT USING A LOW-POWER RADAR

CROSS-REFERENCE TO RELATED APPLICATION

This application claims the benefit of U.S. Provisional Application No. 62/504,462 filed 10 May 2017, the disclosure of which is hereby incorporated by reference in its entirety herein.

BACKGROUND

A user may rely upon an electronic device to navigate roads, record experiences, or provide entertainment. New features continue to be developed that facilitate operation, enhance security, or expand capabilities of the electronic device with the utilization of sensors or high-performance circuitry. Although advantageous, these features may increase power consumption within the electronic device. For example, a camera sensor may continuously consume power while waiting for an opportunity to sense a user. Consequently, an increased demand on power can limit mobile operation of the electronic device and frustrate users.

Some techniques may turn off components of the electronic device until a user physically touches the electronic device. For example, the camera sensor may be turned on after the user pushes a button or touches a display of the electronic device. Alternatively, a sleep timer may cause the electronic device to turn off the component after a predetermined amount of time. Although power is conserved, the manual prompting or automatic shut-off may inconvenience a user or delay a response of the electronic device. As such, there is a trade-off between power conservation and minimizing delay or user inconvenience, which current approaches have difficulty balancing.

SUMMARY

Techniques and apparatuses are described that implement power management using a low-power radar. The described techniques enable a radar system to reduce overall power consumption, thereby facilitating incorporation and utilization of the radar system within power-limited devices. In one aspect, the radar system can replace other power-hungry sensors and provide improved performance in the presence of different environmental conditions, such as low lighting, motion, or overlapping targets. In another aspect, the radar system can cause other components within the electronic device to switch to an off-state based on detected activity in an external environment. By actively switching the components between an on-state or the off-state, the radar system enables the computing device to respond to changes in the external environment without the use of an automatic shut-off timer or a physical touch or verbal command from a user.

Aspects described below include a system comprising a computing device and a radar system. The computing device is configured to provide content to a user. The radar system is configured to transmit and receive radar signals. The radar system is also configured to process the received radar signals to detect activity associated with the user. Based on the detected activity, the radar system is configured to adjust power consumption of the computing device.

Aspects described below include an apparatus comprising a component and a radar system. The component is configured to operate according to an on-state and an off-state. The off-state consumes less power than the on-state. The radar system is configured to transmit and receive radar signals. The radar system is also configured to process the received radar signals to detect an activity within an external environment. Based on the detected activity, the radar system is configured to adjust power consumption of the apparatus by switching the operation of the component between the on-state and the off-state.

Aspects described below also include a method comprising transmitting and receiving radar signals via a radar system. The method also includes processing the received radar signals to detect an activity within an external environment. Based on the detected activity, the method includes adjusting power consumption of a computing device.

Aspects described below also include a system comprising means for adjusting power consumption within a computing device based on activity that is detected in an external environment via a radar system.

BRIEF DESCRIPTION OF THE DRAWINGS

Apparatuses of and techniques enabling power management using a low-power radar are described with reference to the following drawings. The same numbers are used throughout the drawings to reference like features and components:

FIG. 2-1 illustrates an example radar system as part of a computing device.

FIG. 2-2 illustrates an example transceiver and processor.

FIG. 3-1 illustrates an example power mode.

FIG. 3-2 illustrates an example relationship between duty cycle, power consumption and response delay.

FIG. 7-1 illustrates example active and inactive gesture frames and feature frames.

FIG. 7-2 illustrates an example pulse mode feature frame.

FIG. 7-3 illustrates an example burst-mode feature frame.

DETAILED DESCRIPTION

Overview

Figure 1:
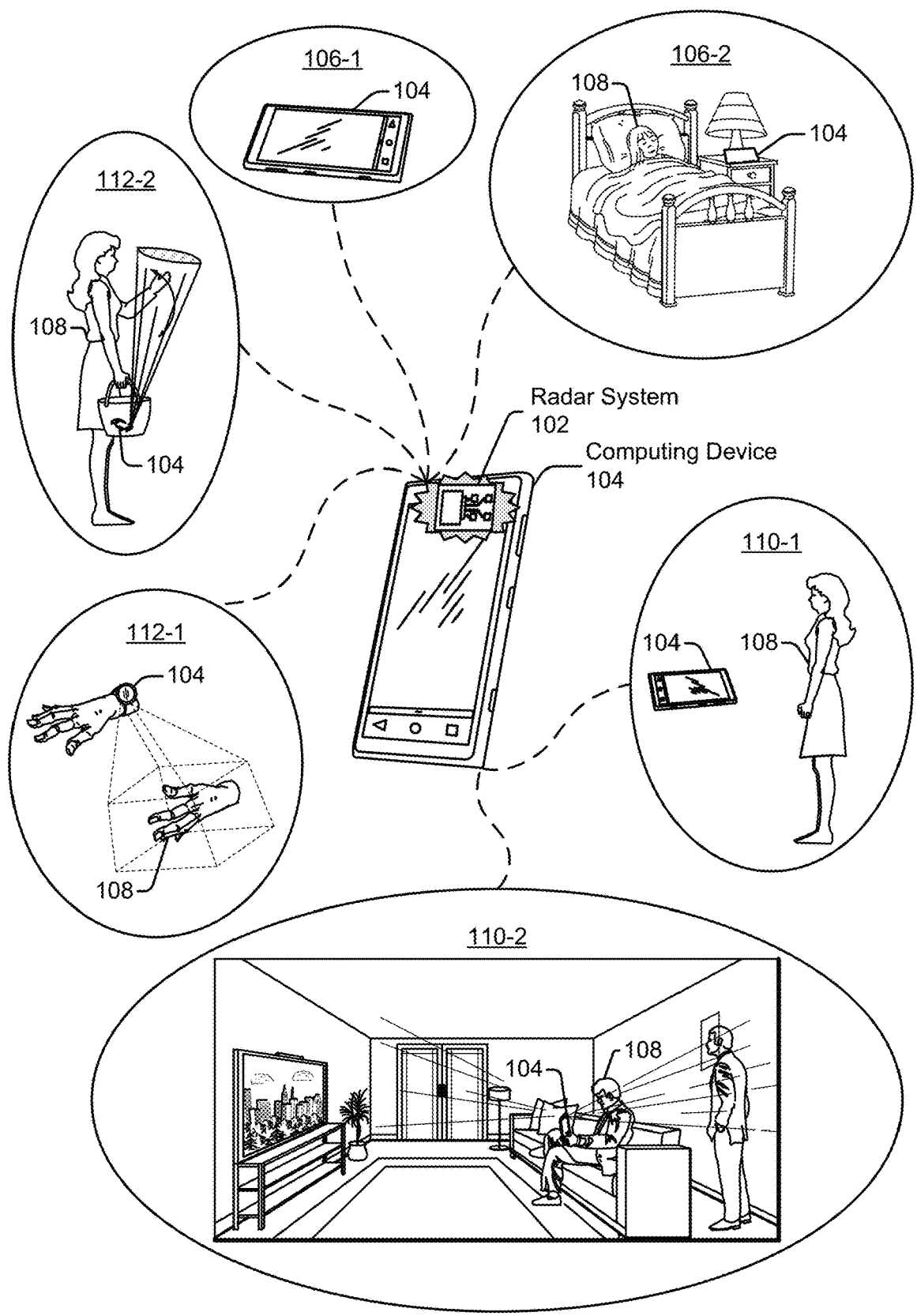
FIG. 1 illustrates example environments in which power management using a low-power radar can be implemented.

Limitations of available power can significantly impact features or capabilities of an electronic device. Advanced features may strain the electronic device's power resources, thereby reducing a duration of mobile operation or causing the electronic device to be recharged more often. Some techniques may turn off components until a user physically touches the electronic device. However, a delay associated with waiting for the user to touch the electronic device may cause the electronic device to respond slower to the user. In general, there is a trade-off between conserving power and responsiveness.

Some advanced features may include the detection and tracking of objects, mapping surfaces, and recognizing targets, which can be performed using a radar. While radar is a common tool used in military and air-traffic-control operations, technological advances are making it possible to integrate radars in electronic devices. There are, however, many challenges associated with using radar in commercial devices and commercial applications. One such problem involves power constraints within small or mobile electronic devices. Operations of some radars can significantly drain a battery of an electronic device and cause a user to frequently recharge the electronic device. Consequently, advantages of utilizing the radar may not be realized with the effective operation of the radar curtailed or disabled due to limitations of available power.

This document describes techniques and devices enabling power management using a low-power radar. The described techniques enable a radar system to reduce overall power consumption, thereby facilitating incorporation and utilization of the radar system within power-limited devices. Power consumption is reduced through customization of the transmission or processing of radar signals within the radar system. During transmission, different duty cycles, transmit powers, or framing structures can be utilized to collect appropriate data based detected activity in an external environment. During processing, different hardware or different radar pipelines can be utilized to appropriately analyze the radar data. Instead of disabling the radar system, the described techniques enable the radar system to continuously monitor a dynamic environment and maintain responsiveness while conserving power.

The radar system can also conserve power within the electronic device. In one aspect, the radar system can replace other power-hungry sensors and provide improved performance in the presence of different environmental conditions, such as low lighting, motion, or overlapping targets. In another aspect, the radar system can cause other components within the electronic device to switch to an off-state based on detected activity within an external environment. These components may include a global positioning system, a wireless communication transceiver, a display, a speaker, a camera, a gyroscope, an accelerometer, and so forth. By actively switching the components between an on-state or the off-state, the radar system enables the computing device to respond to changes in the external environment without the use of an automatic shut-off timer or a physical touch or verbal command from a user.

Example Environment

FIG. 1 is an illustration of example environments in which techniques using, and an apparatus including, power management using a low-power radar may be embodied. Different types of environments are shown in FIG. 1, including idle environments 106-1 and 106-2, aware environments 110-1 and 110-2, and engagement environments 112-1 and 112-2. These environments are associated with different probabilities that a user 108 interacts with or utilizes a feature of a radar system 102 or a computing device 104 and are organized from a lowest to highest probability of user interaction. The radar system 102 is shown to be incorporated within the computing device 104. The radar system 102 can identify the different types of environments, operate at a low-power mode, and conserve power within the computing device 104. Although the computing device 104 is shown as a smart phone or a computing watch in FIG. 1, the computing device 104 may be implemented as any suitable computing or electronic device, as described in further detail with respect to FIG. 2-1.

In the idle environments 106-1 and 106-2 the user 108 is not present or asleep, respectively. In the aware environment 110-1, the user 108 approaches the computing device 104 or is otherwise within a close proximity to the computing device 104. In the aware environment 110-2, the user 108 is looking at or interacting with the computing device 104 and another user is facing the computing device 104. In the engagement environments 112-1 and 112-2, the user 108 performs a gesture, which is recognized using the radar system 102 and enables the user 108 to interact with the computing device 104.

Based on the type of environment, the radar system 102 can switch between different power modes that enable the radar system 102 to adjust power consumption and responsiveness. For example, the radar system 102 can operate in a low-power mode that is characterized by a low-duty cycle (e.g., slow update rate) in the idle environments 106-1 and 106-2. Upon detecting a change in the environments 106-1 or 106-2 (e.g., the user 108 approaching the computing device 104 or waking up), the radar system 102 switches to a middle-power mode whose update rate enables the radar system 102 to actively track the user 108. If the radar system 102 detects a motion that precedes a gesture or occurs at a start of a gesture, the radar system 102 switches to a high-power mode whose faster update rate enables the radar system 102 to recognize the gesture performed in the engagement environments 112-1 or 112-2. Through the use of the multiple power modes, the radar system 102 can dynamically balance power consumption and responsiveness in a variety of different environments.

In addition to the use of the multiple power modes, the radar system 102 can also conserve power by turning other components within the computing device on or off based on the external environment. For example, if the computing device 104 is playing music via speakers and the user 108 walks away, the radar system 102 can switch the speakers to an off-state to conserve power until the user 108 returns. As another example, a camera sensor can remain in an off-state until the radar system 102 determines the user 108 is within a predetermined distance. Other example components for which the radar system 102 can switch on or off to conserve include a global positioning system, a wireless communication transceiver, a display, a gyroscope, or an accelerometer. The radar system 102 can also determine change the operational state of these components based on a motion of the user (e.g., whether or not the user 108 is asleep or otherwise preoccupied). Through use of the radar system 102, the computing device 104 can quickly respond to the user 108 and conserve power without the use of automatic shut-off timers or the user physically touching or verballing controlling the computing device 104.

Figures 1, 2:
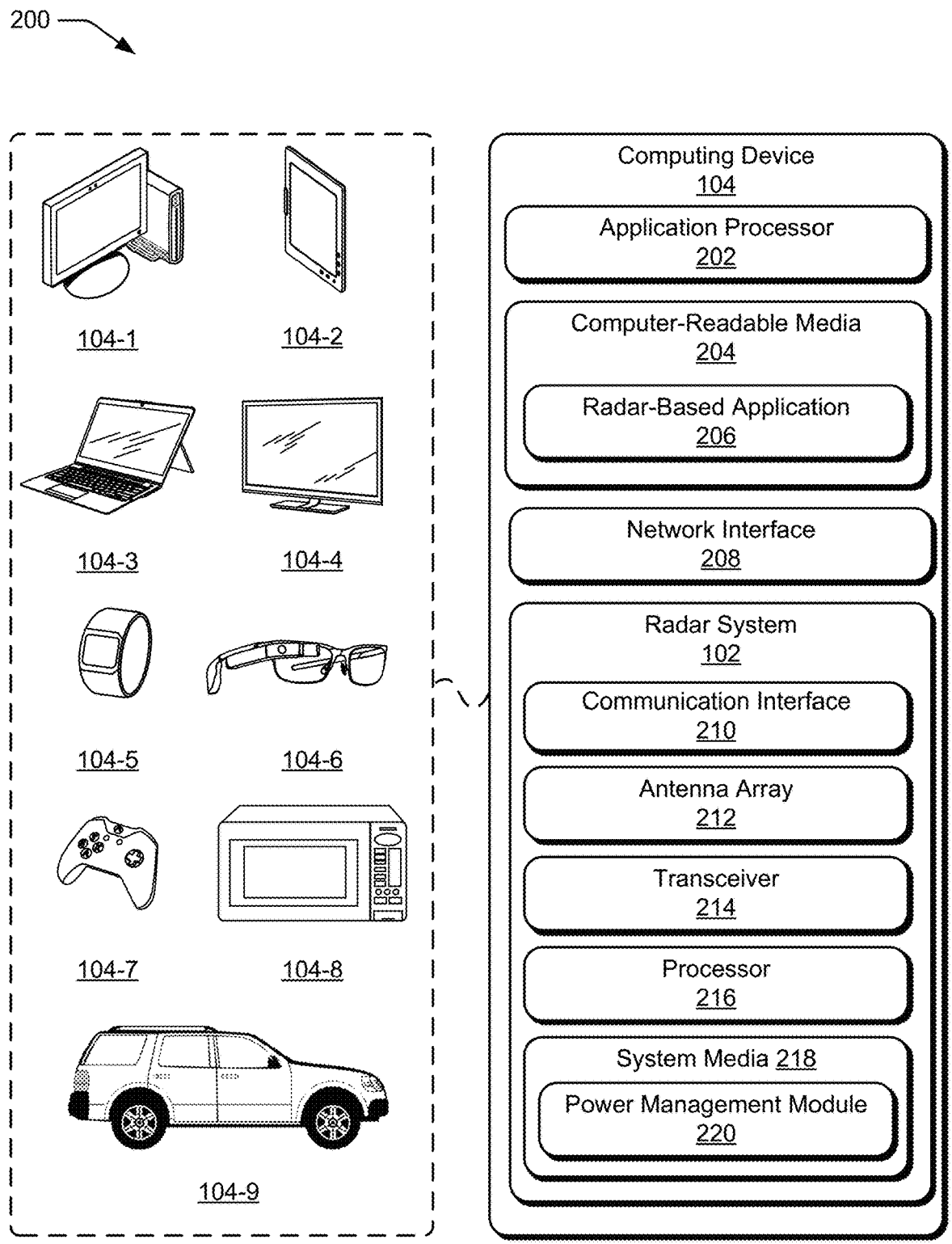
Figure 2:
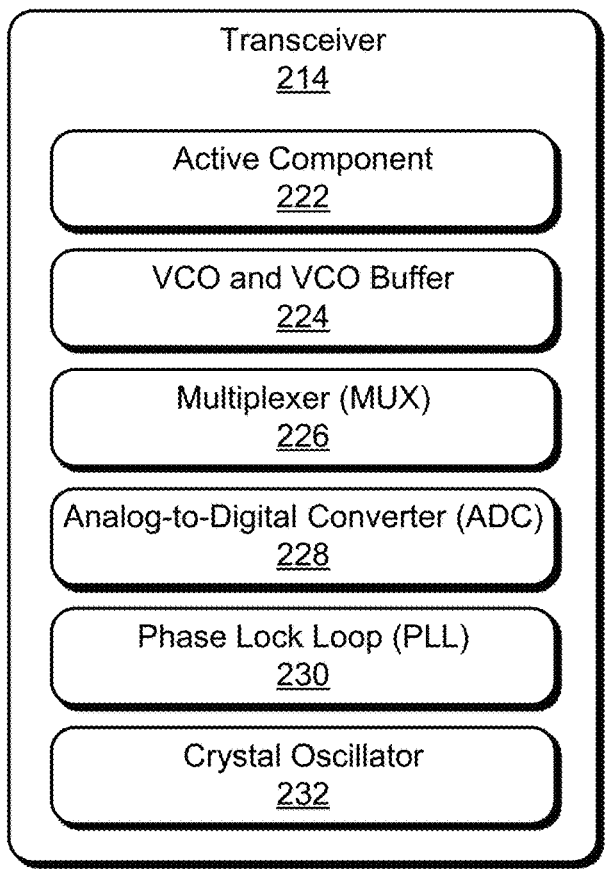
Figure 2:
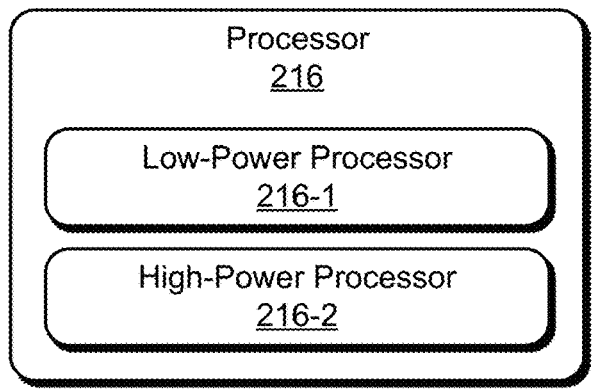

In more detail, consider FIG. 2-1, which illustrates the radar system 102 as part of the computing device 104. The computing device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as drones, track pads, drawing pads, netbooks, e-readers, home-automation and control systems, wall displays, and other home appliances. Note that the computing device 104 can be wearable, non-wearable but mobile, or relatively immobile (e.g., desktops and appliances). The radar system 102 can also be used as a stand-alone radar system or used with, or embedded within, many different computing devices 104 or peripherals, such as in control panels that control home appliances and systems, in automobiles to control internal functions (e.g., volume, cruise control, or even driving of the car), or as an attachment to a laptop computer to control computing applications on the laptop.

The computing device 104 includes at least one application processor 202 and computer-readable media 204, which includes memory media and storage media. Applications and/or an operating system (not shown) embodied as computer-readable instructions on the computer-readable media 204 can be executed by the application processor 202 to provide some of the functionalities described herein. The computer-readable media 204 also includes a radar-based application 206, which uses radar data generated by the radar system 102 to perform a function, such as detect a presence of a user, track the user's gestures for touch-free control, provide collision avoidance for autonomous driving, or identify the type of environment (e.g., any of the environments shown in FIG. 1).

The computing device 104 may also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The computing device 104 may also include a display (not shown).

Various implementations of the radar system 102 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. In FIG. 2-1, the radar system 102 includes at least one of each of the following components: a communication interface 210, an antenna array 212, a transceiver 214, a processor 216, and a system media 218 (e.g., one or more computer-readable storage media). The communication interface 210 provides radar data produced via the radar system 102 to a remote device, though this need not be used when the radar system 102 is integrated within the computing device 104. The radar data provided by the communication interface 210 is usable by the radar-based application 206.

The transceiver 214 includes circuitry and logic for transmitting and receiving radar signals via the antenna array 212. Components of the transceiver 214 can include amplifiers, mixers, switches, analog-to-digital converters, filters, and so forth for conditioning the radar signals. The transceiver 214 can also include logic to perform in-phase/quadrature (I/Q) operations, such as modulation or demodulation. Some of the components of the transceiver 214 are further described with respect to FIG. 2-2.

The transceiver 214 can be configured for continuous wave or pulsed radar operations. A variety of modulations can be used to produce the radar signals, including linear frequency modulations, triangular frequency modulations, stepped frequency modulations, or phase modulations. The transceiver 214 can be configured to emit microwave radiation in a 1 GHz to 400 GHz range, a 4 GHz to 100 GHz range, and narrower bands, such as 57 GHz to 63 GHz. Via the antenna array 212, the radar system 102 can form beams that are steered or un-steered, wide or narrow, or shaped (e.g., hemisphere, cube, fan, cone, cylinder). In some cases, the steering and shaping can be achieved through digital beamforming.

The processor 216 can be implemented as a digital signal processor, a controller, an application processor (e.g., the application processor 202), a special-purpose processor configured to manage power consumption, or some combination thereof. The system media 218, which may or may not be included within the computer-readable media 204, includes power management module 220. The power management module 220 enables the radar system 102 to conserve power internally or externally within the computing device 104.

The power management module 220 can employ both static and dynamic power-conservation techniques. The static power-conservation techniques conserve power based on a current type of radar data the radar system 102 is to collect. The static techniques include predefined power modes, customizable framing structures, adjustable transmit power, or the use of different hardware that consume different amounts of power. Other dynamic power conservation techniques conserve power by actively switching between the power modes or triggering different radar pipelines associated with activity detected within the external environment. In general, the power management module 220 determines when power can be conserved, how power can be conserved, and incrementally adjust power consumption to enable the radar system 102 to operate within limitations of available power. In some cases, the power management module 220 may monitor an amount of available power remaining and adjust operations of the radar system 102 accordingly. For example, if the remaining amount of power is low, the power management module 220 may continue operating at a low-power mode instead of switching to a higher power mode. The radar system 102 also includes additional components that enable power to be conserved, as described in further described with respect to FIG. 2-2.

FIG. 2-2 illustrates an example transceiver 214 and processor 216. The transceiver 214 includes multiple components that can be individually turned on or off via the power management module 220 in accordance with an operational state of the radar system 102. The transceiver 214 is shown to include at least one of each of the following components: an active component 222, a voltage-controlled oscillator (VCO) and voltage-controlled buffer 224, a multiplexer 226, an analog-to-digital converter (ADC) 228, a phase lock loop (PLL) 230, and a crystal oscillator 232. If turned on, each of these components consume power, even if the radar system 102 is not actively using these components to transmit or receive radar signals. The active component 222, for example, can include an amplifier or filter that is coupled to a supply voltage. The voltage-controlled oscillator 224 generates a frequency-modulated radar signal based on a control voltage that is provided by the phase lock loop 230. The crystal oscillator 232 generates a reference signal for signal generation, frequency conversion (e.g., upconversion or downconversion), or timing operations within the radar system 102. By turning these components on or off, the power management module 220 enables the radar system 102 to quickly switch between active and inactive operational states and conserve power during various inactive time periods. These inactive time periods may be on the order of microseconds (μs), milliseconds (ms), or seconds (s). The different operational states of the radar system 102 are further described with respect to FIG. 8.

The processor 216 is shown to include multiple processors that consume different amounts of power, such as a low-power processor 216-1 and a high-power processor 216-2. As an example, the low-power processor 216-1 can include a processor that is embedded within the radar system 102 and the high-power processor can include the application processor 202 or some other processor that is external to the radar system 102. The differences in power consumption can result from different amounts of available memory or computational ability. For instance, the low-power processor 216-1 may utilize less memory, perform fewer computations, or utilize simpler algorithms relative to the high-power processor 216-2. Despite these limitations, the low-power processor 216-1 can process data for less complex radar-based applications 206, such as proximity detection or motion detection. The high-power processor 216-2, in contrast, may utilize a large amount of memory, perform a large amount of computations, or execute complex signal processing, tracking, or machine learning algorithms. The high-power processor 216-2 may process data for high-profile radar-based applications 206, such as gesture recognition, and provide accurate, high-resolution data through the resolution of angular ambiguities or distinguishing of multiple users 108.

To conserve power, the power management module 220 can control whether the low-power processor 216-1 or the high-power processor 216-2 are used to process the radar data. In some cases, the low-power processor 216-1 can perform a portion of the analysis and pass data onto the high-power processor 216-2. Example data may include a clutter map, raw or minimally processed radar data (e.g., in-phase and quadrature data or range-Doppler data), or digital beamforming data. The low-power processor 216-1 may also perform some low-level analysis to determine whether there is anything of interest in the environment for the high-power processor 216-2 to analyze. In this way, power can be conserved by limiting operation of the high-power processor 216-2 while utilizing the high-power processor 216-2 for situations in which high-fidelity or accurate radar data is requested by the radar-based application 206. Other factors that can impact power consumption within the radar system 102 are further described with respect to FIG. 3-1.

Figure 3:
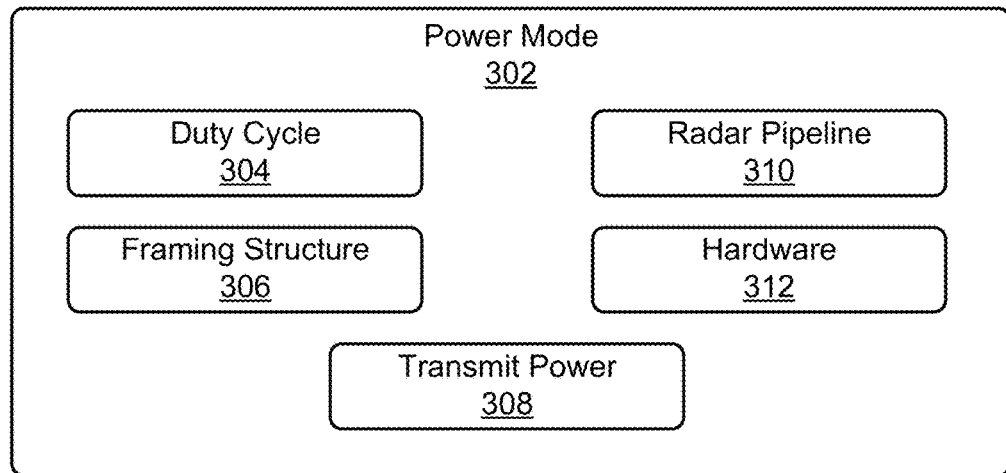
Figure 1:
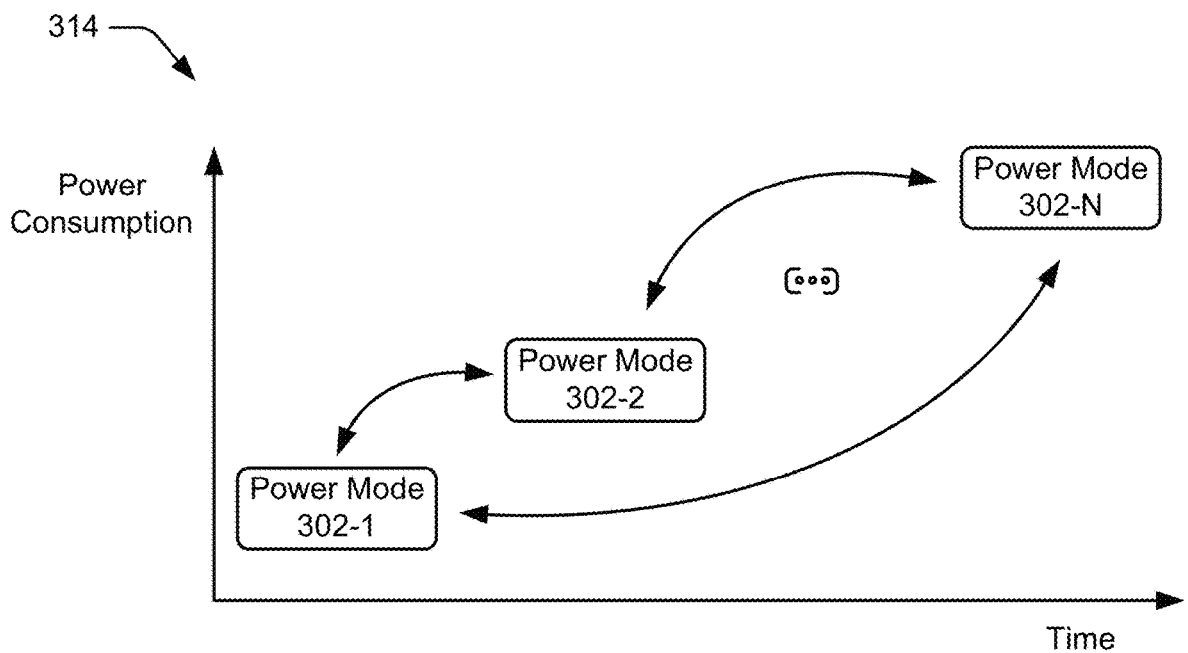
Figure 3:
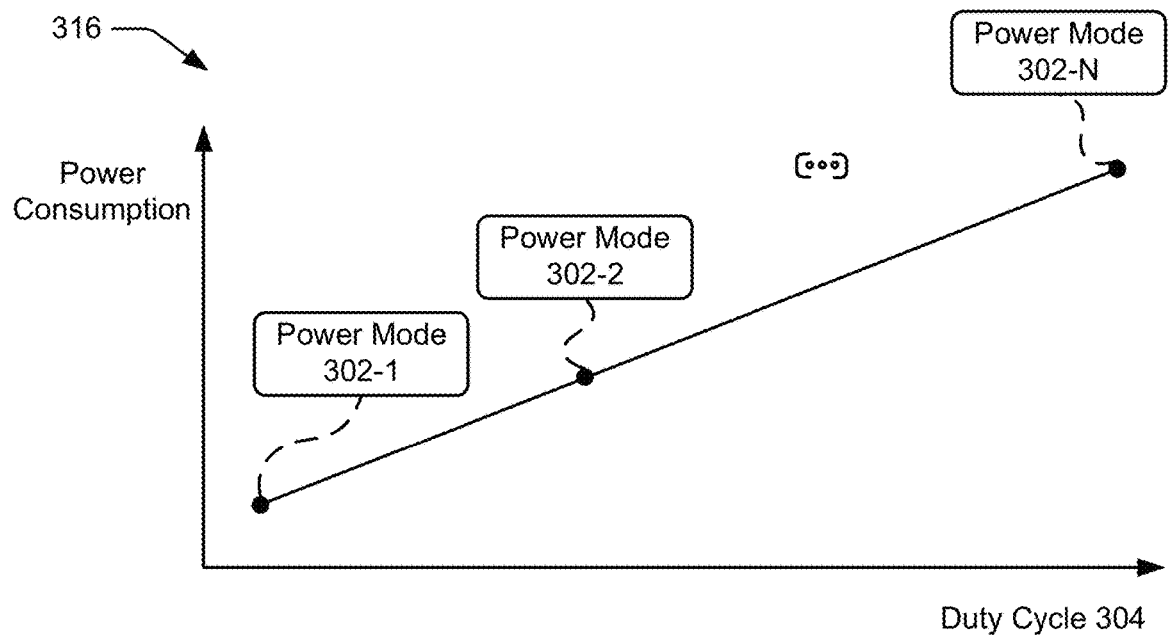
Figure 2:
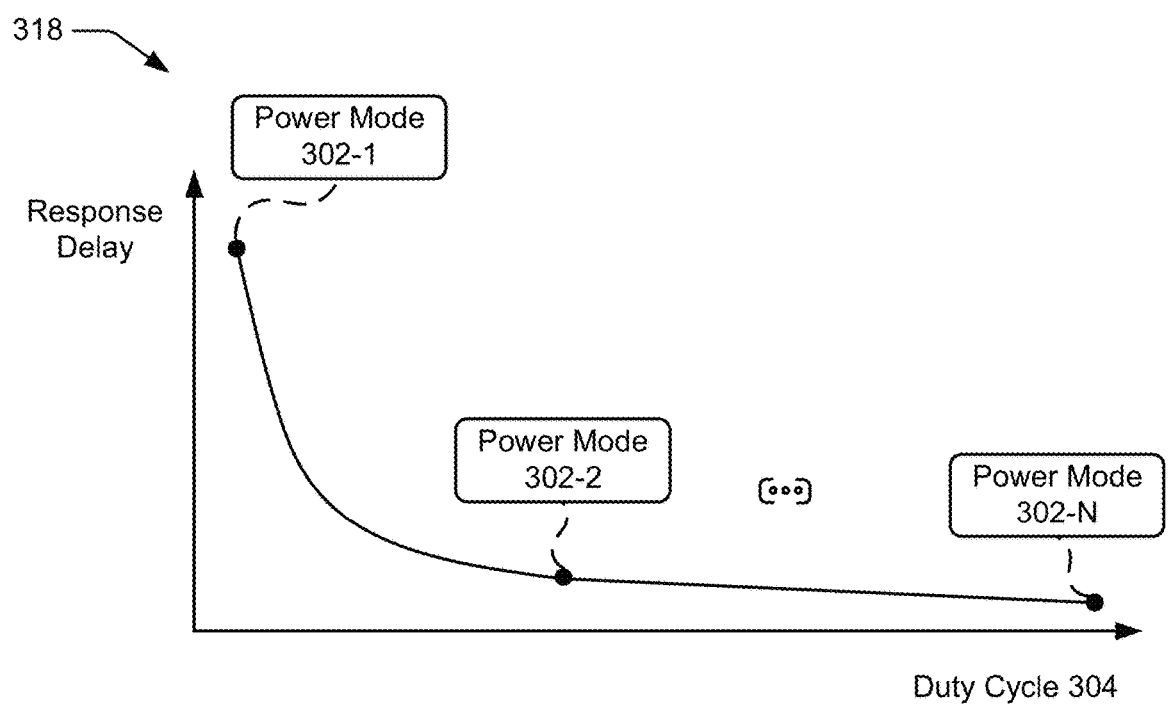

FIG. 3-1 illustrates an example power mode 302. The power mode 302 is shown to be associated with a duty cycle 304, a framing structure 306, a transmit power 308, a radar pipeline 310, or hardware 312. The duty cycle 304 represents how often the radar system 102 is active (e.g., actively transmitting or receiving radar signals). The framing structure 306 specifies a configuration, scheduling, and signal characteristics associated with the transmission and reception of the radar signals. In general, the framing structure 306 is set up such that the appropriate radar data can be collected based on the external environment. The framing structure 306 can be customized to facilitate collection of different types of radar data for different applications (e.g., proximity detection, feature recognition, or gesture recognition). Based on the framing structure 306, the power management module 220 can turn off the components within the transceiver 214 in FIG. 2-2 to conserve power. An example framing structure 306 is further described with respect to FIG. 6.

The power mode 302 can also be associated with a transmit power 308, which can vary based on a range or distance that the radar system 102 is monitoring. If the user 108 is farther from the computing device 104, for example, a higher transmit power 308 may be used to detect the user 108. Alternatively, if the user 108 is closer to the computing device 104, a lower transmit power 308 may be used to conserve power. The radar pipeline 310 is a processing pipeline that analyzes the radar data and can enable the radar system 102 to switch between different power modes. The radar pipeline 310 can specify the type of duty cycle 304, framing structure 306, transmit power 308, or hardware 312 that is used to generate or process the radar data. Different types of radar pipelines 310 are further described with respect to FIG. 4. The hardware 312 can include components whose power consumption can be individually controlled (e.g., the components of the transceiver 214 in FIG. 2-2) or components that consume different amounts of power during operation (e.g., the low-power processor 216-1 and the high-power processor 216-2 in FIG. 2-2).

In a graph 314, the power management module 220 causes the radar system 102 to toggle operation between N different power modes 302, where N is a positive integer. The power mode 302-1 is shown to utilize a smallest amount of power whereas the power mode 302-N consumes a largest amount of power. As an example, the power mode 302-1 consumes power on the order of a few milliwatts (mW) (e.g., approximately 2 mW or less than 5 mW) whereas the power mode 302-N consumes power on the order of several milliwatts (e.g., approximately 8 mW or greater than 20 mW).

Different triggers that are defined within the radar pipelines 310 cause the power management module 220 to switch between any two power modes 302. The triggers may be associated with a detected activity within the surrounding environment. Different types of activities can include a change in a quantity of users within the external environment, a change in a type of motion performed by a user 108, a change in a distance to the user 108, a change in a velocity of a motion performed by the user 108, a change in a reflected signal strength associated with the user 108. Differences in power consumption across the power modes 302 can be due to different duty cycles 304, framing structures 306, transmit powers 308, radar pipelines 310, or hardware 312. The duty cycle 304 in particular affects the power consumption and responsiveness of the radar system 102, as further described with respect to FIG. 3-2.

FIG. 3-2 illustrates an example relationship between the duty cycle 304, power consumption, and response delay. In graph 316, power consumption is shown to be proportional to the duty cycle 304. In other words, higher duty cycles 304 result in larger amounts of power being consumed by the radar system 102. As an example, the power mode 302-1 uses a duty cycle 304 that is on the order of a few hertz (e.g., approximately 1 Hz or less than 5 Hz) while the power mode 302-N uses a duty cycle 304 that is on the order of tens of hertz (e.g., approximately 20 Hz or greater than 10 Hz).

In contrast, a response delay is inversely-proportional to the duty cycle 304. A graph 318 shows the response delay exponentially increasing while the duty cycle 304 decreases. The response delay associated with the power mode 302-1 may be on the order of hundreds of milliseconds (ms) (e.g., 1000 ms or more than 300 ms) while the response delay associated with the power mode 302-N may be on the order of several milliseconds (e.g., 50 ms or less than 200 ms). Instead of operating at either the lowest power mode 302-1 or the highest-power mode 302-N, the radar pipelines 310 enable the radar system 102 to dynamically switch between different power modes 302 such that response delay and power consumption are managed together based on the activity within the environment. Example radar pipelines 310 are further described with respect to FIG. 4.

Figure 4:
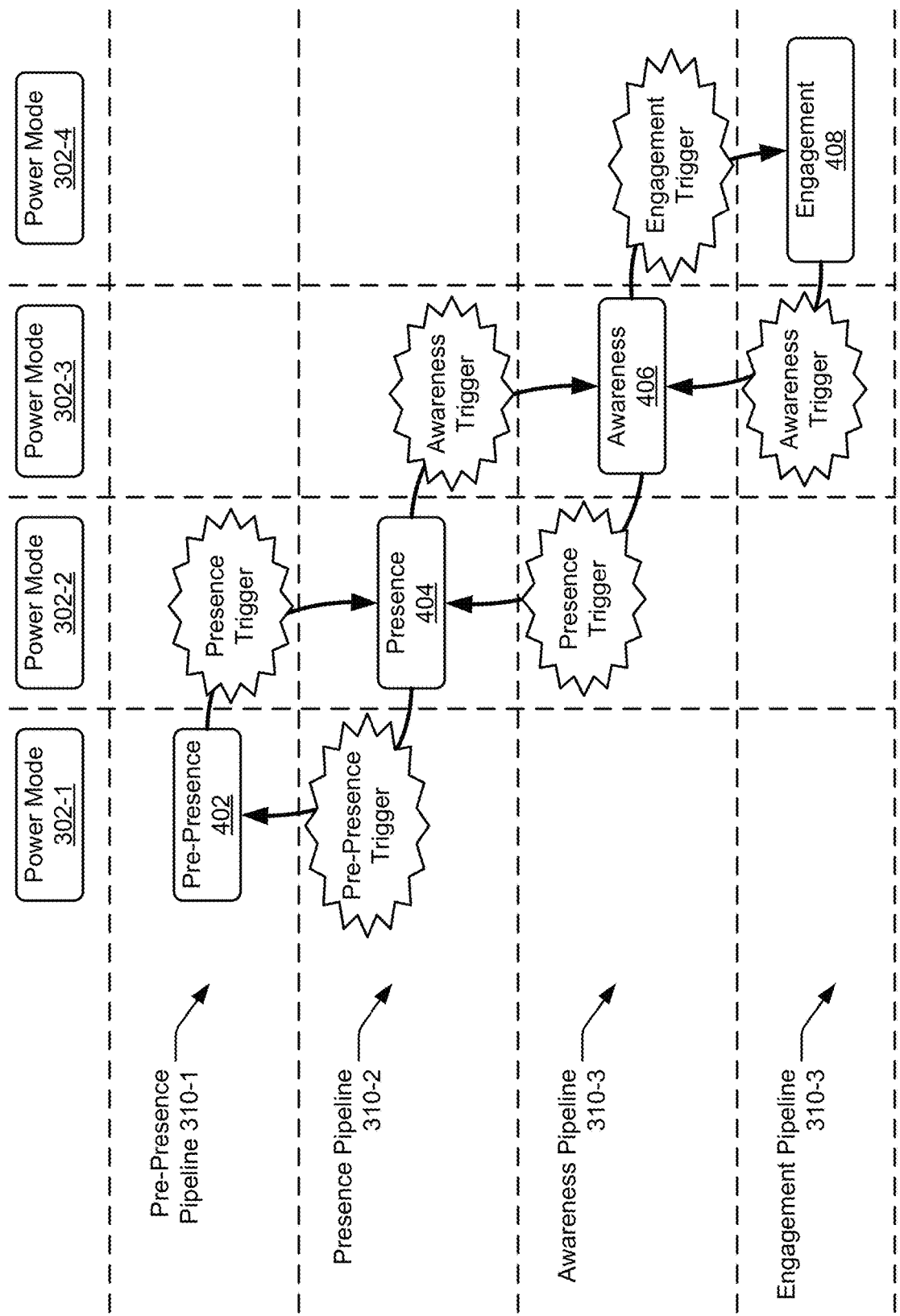
FIG. 4 illustrates example radar pipelines.

FIG. 4 illustrates four example radar pipelines 310-1, 310-2, 310-3, and 310-4. Each of the radar pipelines 310 perform radar operations associated with respective power modes 302-1, 302-2, 302-3, and 302-4. The pre-presence pipeline 310-1, for example, is employed if a presence of the user 108 is not known for certain. The pre-presence pipeline 310-1 can monitor the environment and determine whether the computing device 104 moves or whether there is motion within the environment, which may indicate a presence of the user 108. The presence pipeline 310-2 is used to confidently determine a presence of the user 108. If the user 108 moves closer to the radar system 102 or performs some sort of motion that is advantageous to monitor using a higher duty cycle 304, the awareness pipeline 310-3 is activated. The awareness pipeline 310-3 may track the user 108 and monitor a distance between the user 108 and the computing device 104. Likewise, the engagement pipeline 310-4 is employed to collect radar data at a highest duty cycle 304, which may support advanced radar techniques such as gesture recognition. While the engagement pipeline 310-4 consumes more power than the other radar pipelines 310, the higher power consumption enables small or fast motions of the user 108 to be recognized, which the other radar pipelines 310 may be unable to confidently or accurately evaluate.

Each of the radar pipelines 310-1, 310-2, 310-3, and 310-4 employ a respective radar operation, such as a pre-presence operation 402, a presence operation 404, an awareness operation 406, and an engagement operation 408. Each of these radar operations may utilize a particular duty cycle 304, framing structure 306, transmit power 308, or hardware 312 according to the power mode 302. In general, the radar operations monitor the environment and detect triggers that activate a lower-power or a higher-power radar pipeline 310. Although not shown, the radar operations may utilize more than one power mode 302 to monitor the environment and detect a trigger. Example triggers include motion or the lack of motion, appearance or disappearance of a user, a user moving into or out of a designated region (e.g., a region defined by range, azimuth, or elevation), a change in velocity of a motion associated with the user, or a change in reflected signal strength (e.g., due to changes in radar cross section). In general, the triggers that indicate a higher probability of a user (e.g., the user 108) interacting with the computing device 104 or a preference for a shorter response delay may cause a higher-power radar pipeline 310 to be activated.

Figure 5:
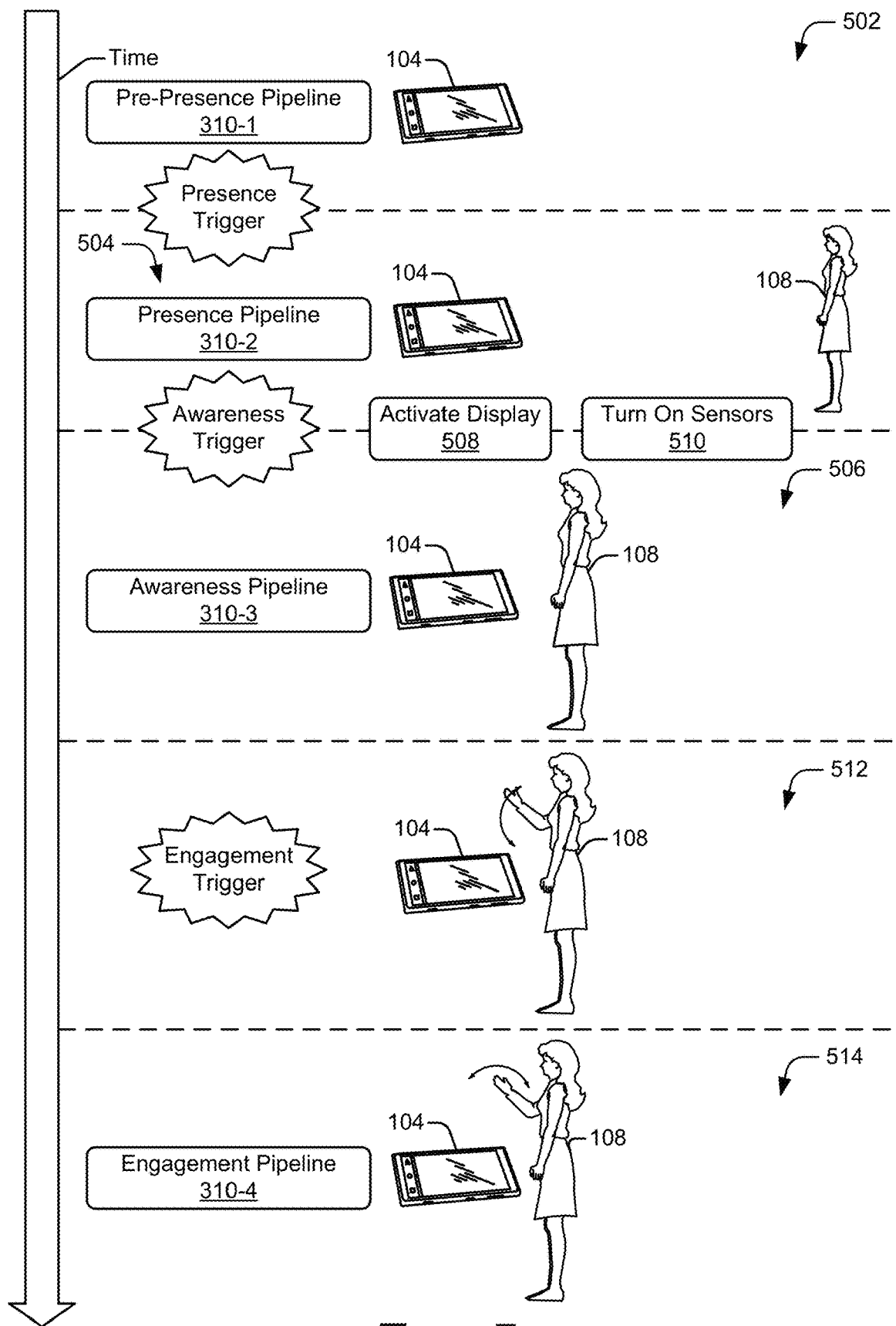
FIG. 5 illustrates an example sequence flow diagram for triggering different radar pipelines.

FIG. 5 illustrates an example sequence flow diagram for triggering different radar pipelines 310, with time elapsing in a downward direction. At 502, the user 108 is not present or is outside a detectable range, similar to the idle environment 106-1 of FIG. 1. For example, the user 108 may be on the order of several meters (m) from the computing device 104 (e.g., at distances greater than 2 m). Therefore, the pre-presence pipeline 310-1 is employed to conserve power via a low duty cycle 304 associated with the power mode 302-1. The pre-presence pipeline 310-1 may also utilize the low-power processor 216-1 to monitor the environment and detect motion, which may be indicative of a presence of the user 108.

At 504, the user 108 approaches the computing device 104 and the pre-presence pipeline 310-1 triggers the presence pipeline 310-2 to confirm a presence of the user 108. As an example, the user 108 may be within a few meters from the computing device 104 at a far distance (e.g., between approximately 1 and 2 m). The presence pipeline 310-2 uses a medium-low duty cycle 304 associated with the power mode 302-2. As the user 108 moves around in the environment, if the user 108 comes within a specified range to the computing device 104, the presence pipeline 310-2 triggers the awareness pipeline 310-3. For example, the awareness pipeline 310-3 may be triggered if the user 108 comes within a close distance, such as within a meter, from the computing device 104. Due to a proximity of the user 108, the presence pipeline 310-2 may also activate a display 508 on the computing device 104 or turn on other sensors 510 that may be utilized by the computing device 104. A camera sensor, for example, may be activated for capturing an image of the user 108. In other examples, a gyroscope or accelerometer may be activated to determine an orientation of the computing device 104 or speakers may be activated to provide an audible tone if the user 108 has a missed call or a new communication (e.g., a text message) is available.

At 506, the awareness pipeline 310-3 tracks and monitors a location or motion of at least one appendage of the user 108 using a medium-high duty cycle 304 associated with the power mode 302-3. Although the user 108 is near the computing device 104, the user 108 may be relatively motionless or performing other tasks that are not associated with the computing device 104. Thus, the medium-high duty cycle 304 enables the radar system 102 to conserve power while enabling the radar system 102 to detect changes that may be indicative of the user 108 preparing to interact with the computing device 104. At 512, the user 108 raises a hand. The awareness pipeline 310-3 determines this motion is indicative of the user 108 moving the hand in position to make a gesture. Therefore, the engagement trigger activates the engagement pipeline 310-3. This motion may also cause a portion of the user 108 to come within a closer distance, such as within several centimeters (cm) from the computing device 104 (e.g., within approximately 50 cm). This proximity may be another engagement trigger that activates the engagement pipeline 310-3.

At 514, the engagement pipeline 310-4 collects the radar data at a high duty cycle 304 associated with the power mode 302-4. This duty cycle 304 enables the radar system 102 to recognize the gesture, which can be used to control the computing device 104 via the radar-based application 206. Although the radar pipelines 310 are shown in a cascaded form in FIG. 4 or sequentially activated in FIG. 5, the framing structure 306 can enable some of the radar pipelines 310 to operate in parallel as further described with respect to FIG. 6.

Figure 6:
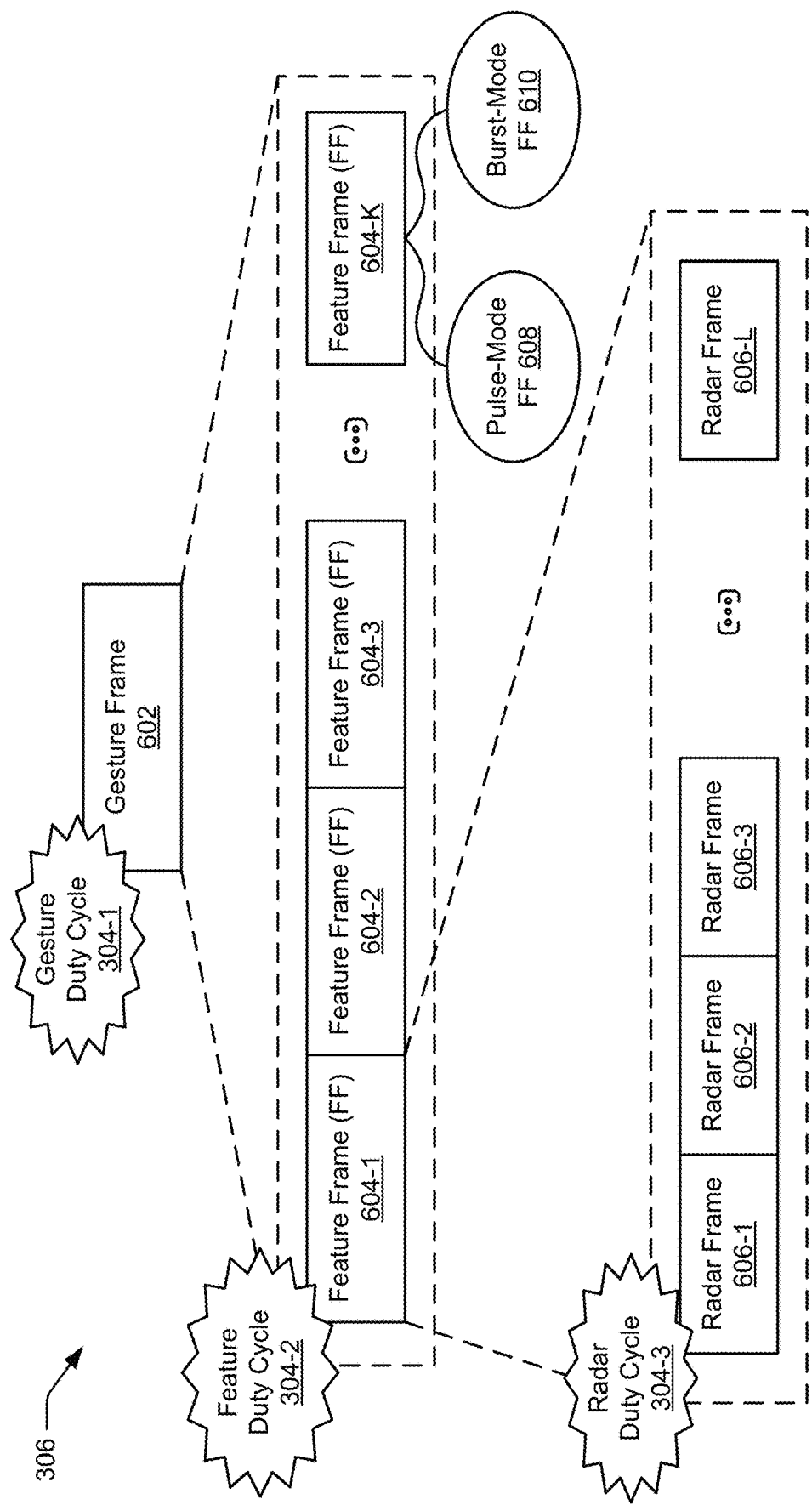
FIG. 6 illustrates an example framing structure.

FIG. 6 illustrates an example framing structure 306. In the depicted configuration, the framing structure 306 is shown to include three framing levels that respectively comprise one or more gesture frames 602, feature frames 604, or radar frames 606. In the depicted configuration, the gesture frame 602 is shown to include K features frames 604 and the feature frame 604-1 includes L radar frames 606, where K and L are positive integers that may or may not be equal to each other. Two example types of feature frames 604 include the pulse-mode feature frame 608 and the burst-mode feature frame 610, which are further described with respect to FIGS. 7-2 and 7-3. A quantity of radar frames 606 may vary across different feature frames 604 and may comprise a few frames or hundreds of frames (e.g., L may equal 5, 15, 30, 100, or 500). The radar data associated with each radar frame 606 is typically saved to a buffer after completion of the radar frame 606 or provided to an appropriate radar pipeline 310 for processing.

Each gesture frame 602 is setup to collect radar data that enables a gesture to be recognized. Example gestures include swipes, two-finger pinch and spread, tap, other multi-dimensional gestures usable with current touch-sensitive displays, sign-language gestures, and so forth. To recognize a gesture, the radar system 102 analyzes multiple features via the feature frames 604. A quantity of feature frames 604 can be based on a complexity of the gesture and may be include a few to a hundred feature frames 604 (e.g., K may equal 2, 10, 30, 60, or 100). The feature frames 604 are used to determine different features associated with a multi-dimensional gesture, such as a particular type of motion, a motion associated with a particular appendage (e.g., a hand or individual fingers), features associated with different portions of the gesture, and so forth. In general, the detection of the feature or the gesture requires multiple observations of the user 108 over a predetermined time period. A duration of the feature frame 604 may be on the order of milliseconds (e.g., between approximately 1 ms and 50 ms). Depending upon the type of gesture, a duration of the gesture frame 602 may be on the order of milliseconds or seconds (e.g., between approximately 10 ms and 10 s).

The radar frames 606 within a feature frame 604 can be customized for a predetermined detection range, range resolution, or doppler sensitivity, which facilitates detection of a particular feature and gesture. The radar frames 606, for example, may utilize a particular type of modulation, bandwidth, frequency, transmit power 308, or timing. The radar frames 606 can also be independently analyzed for basic radar operations, such as search and track, clutter map generation, user location determination, and so forth. A duration of a radar frame 606 may be on the order of tens or thousands of microseconds (e.g., between approximately 30 μs and 5 ms).

Different types of radar pipelines 310 may process different types of frames within the framing structure 306. For example, the pre-presence pipeline 310-1 or the presence pipeline 310-2 may analyze a radar frame 606, the awareness pipeline 310-3 may analyze a feature frame 604, and the engagement pipeline 310-4 may analyze the gesture frame 602. The radar pipelines 310 may operate in parallel on a similar set of radar data in situations in which a same frame type may be used. This may occur if the type of modulations utilized by the radar pipelines 310 are similar. If one of the radar pipelines 310 utilizes a higher duty cycle 304, the power management module 220 can generate the framing structure 306 with a higher duty cycle 304 and the radar pipeline 310 that typically operates with a lower duty cycle can ignore the additional data that is collected due to the higher duty cycle 304 (e.g., the radar pipeline 310 can process the radar frames 606 that align with the lower duty cycle). If the radar pipelines 310 utilize different modulations, different types of radar frames 606 may be interleaved to enable the radar data to be collected over a relatively similar time period. In general, the programmability of the framing structure 306 enables customization of the framing structure 306 to support serial or parallel operation of multiple radar pipelines 310. The framing structure 306 also enables power to be conserved through adjustable duty cycles 304 within each frame type. A gesture duty cycle 304-1, a feature duty cycle 304-2, and a radar duty cycle 304-3 are further described with respect to FIGS. 7-1, 7-2, and 7-3.

Figures 1, 7:
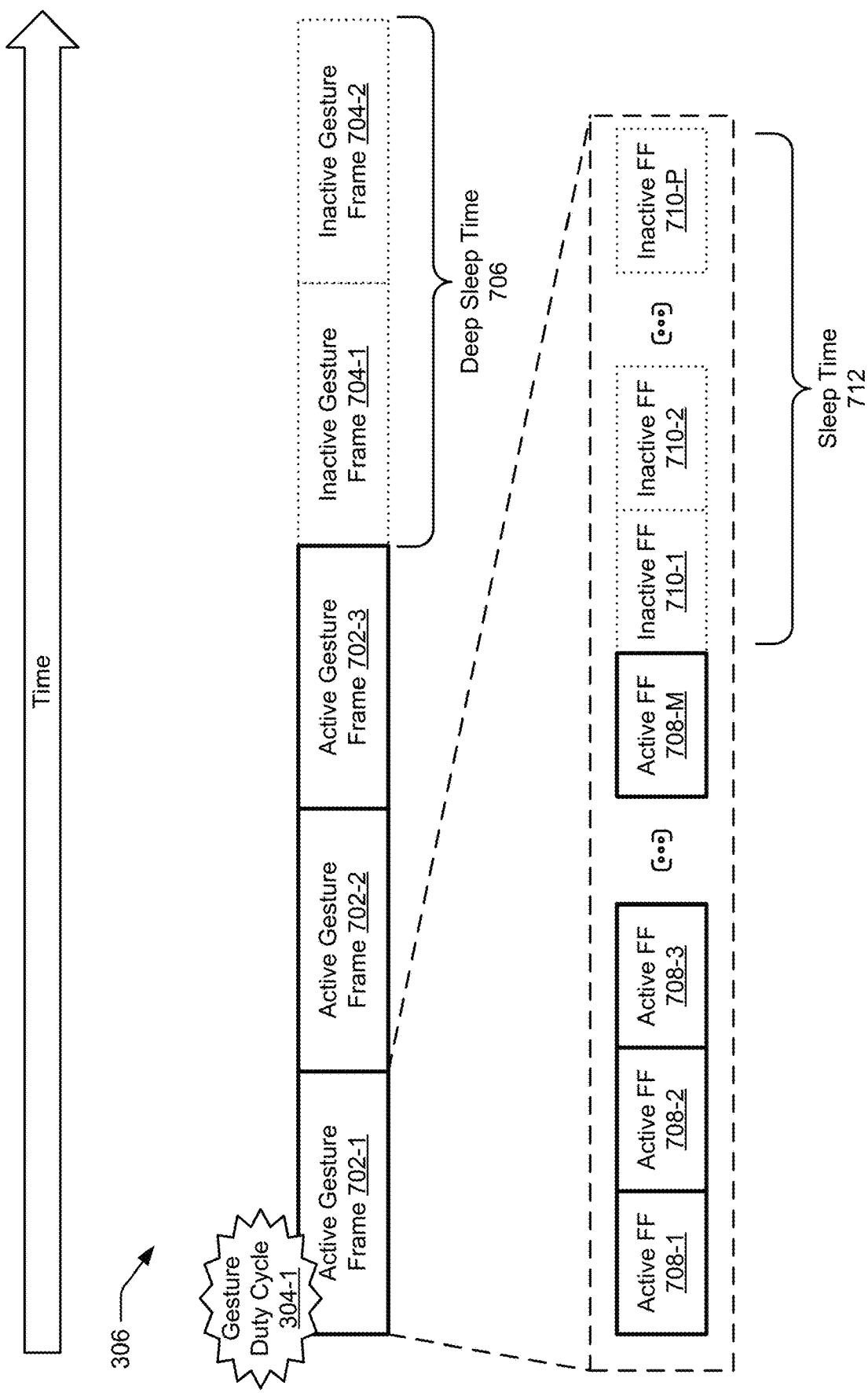
Figures 2, 7:
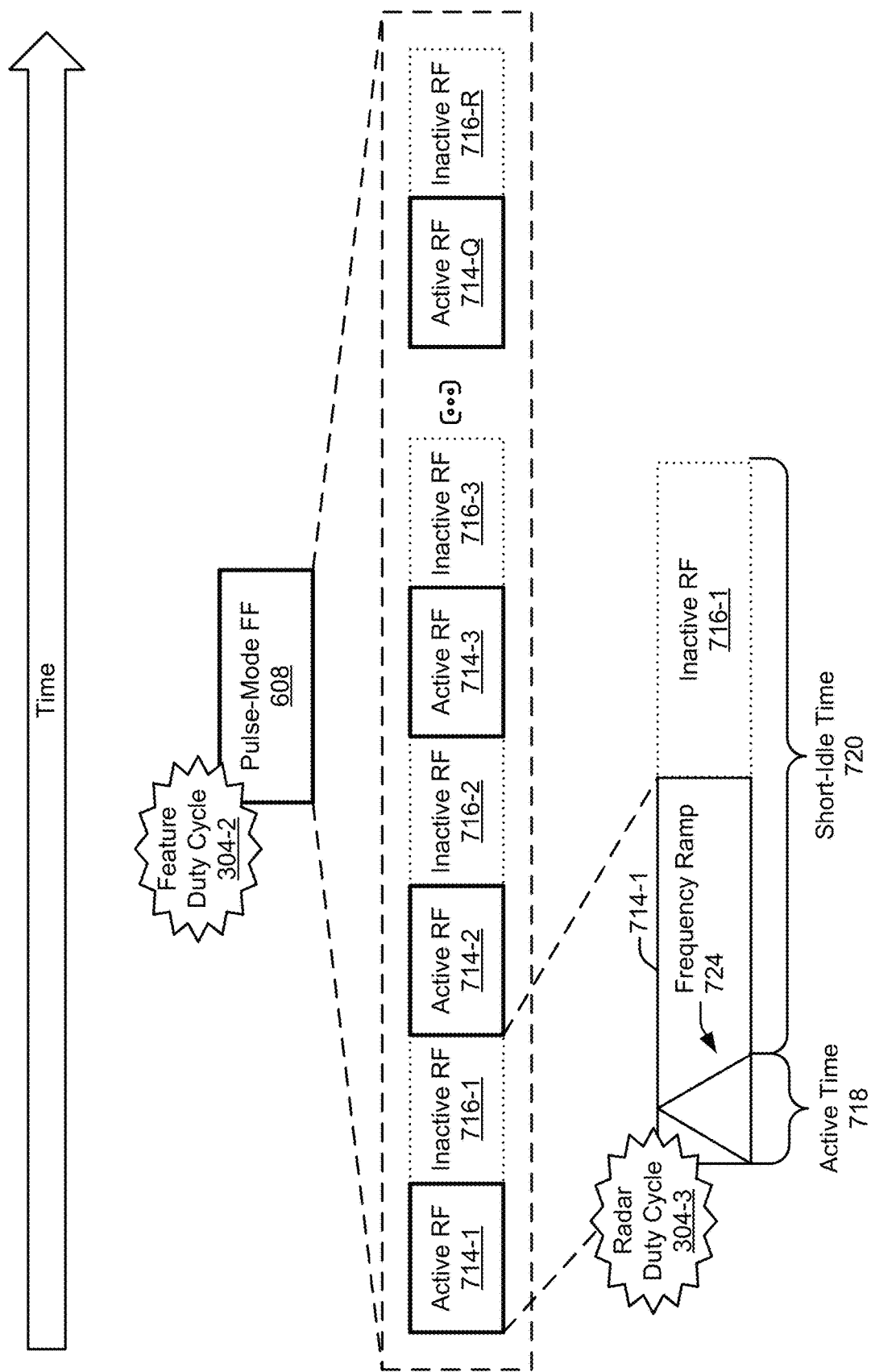
Figures 3, 7:
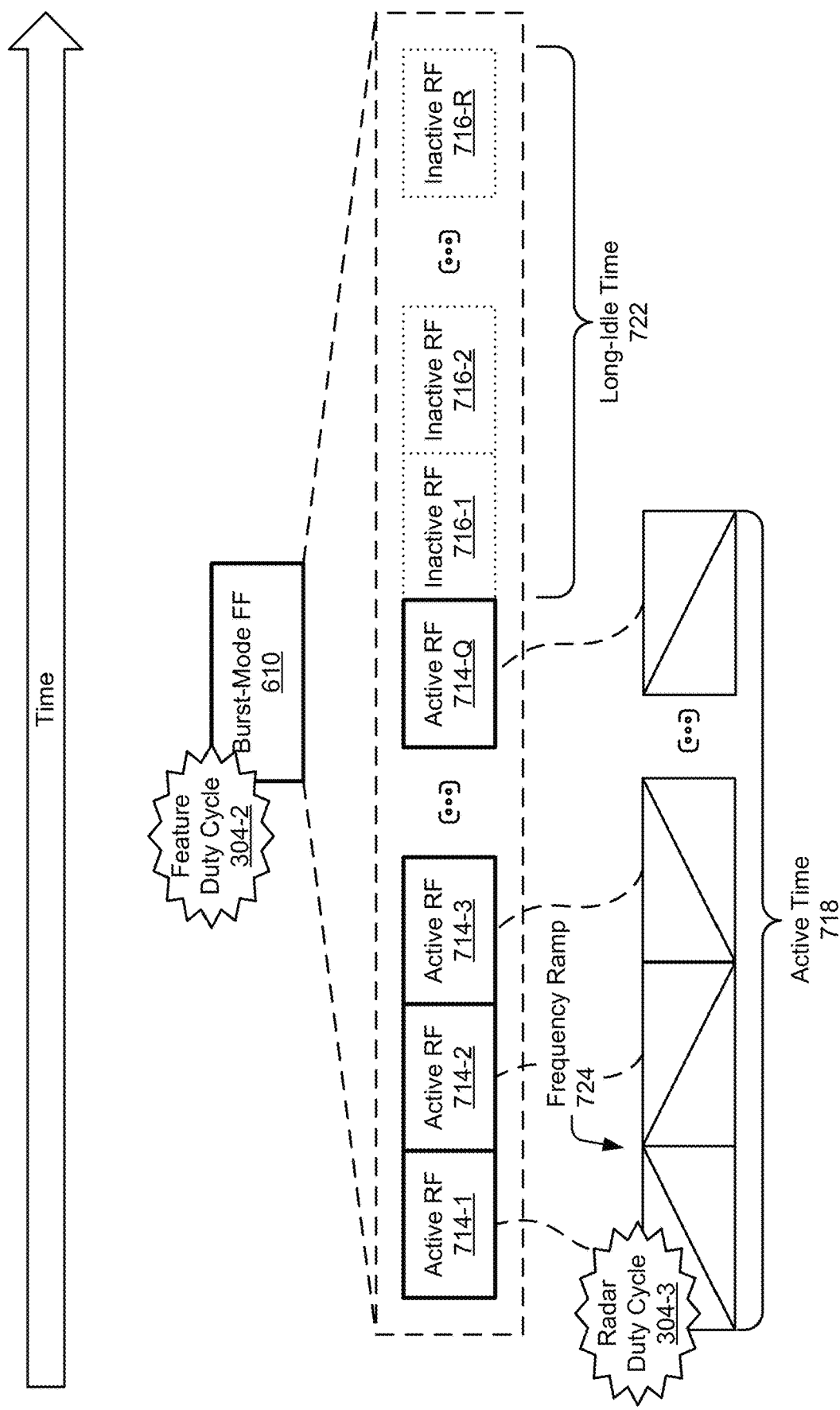

FIG. 7-1 illustrates example active and inactive gesture frames and feature frames. In the depicted configuration, the framing structure 306 is set up to collect data associated with three gestures via active gesture frames 702-1, 702-2, and 702-3. After the active gesture frames 702 occur, the radar system 102 is inactive, as shown by inactive gesture frames 704-1 and 704-2. A duration of the inactive gesture frames 704 is characterized by a deep sleep time 706, which may be on the order of tens of milliseconds or more (e.g., greater than 50 ms).

The gesture duty cycle 304-1 is based on a quantity of active and inactive feature frames. The active gesture frame 702-1 is shown to include M active feature frames 708 and P inactive feature frames 710, where M and P are positive integers whose sum equals K. A ratio of the quantity of active feature frames 708 to inactive feature frames 710 may range between approximately 0.5 to 1. A duration of the inactive feature frames 710 is characterized by a sleep time 712, which may be on the order of a few tens of milliseconds (e.g., between approximately 10 and 50 ms).

FIG. 7-2 illustrates an example pulse-mode feature frame 608. The feature duty cycle 304-2 is based on a quantity of active and inactive radar frames. The pulse-mode feature frame 608 includes Q active radar frames 714 and R inactive radar frames 716, where Q and R are positive integers whose sum equals L. For the pulse-mode feature frame 608, Q and R are equal to each other such that a ratio of the quantity of active radar frames 714 to inactive radar frames 716 is 1. The inactive radar frames 716 occur in-between the active radar frames 714. In this way, the inactive time periods are distributed across the entire pulse-mode feature frame 608.

Within each active radar frame 714, the radar system 102 transmits and receives a radar signal during an active time 718, which occurs at a beginning of the active radar frame 714. An example frequency ramp 724 is shown to occur during the active time 718, whereby a frequency of the radar signal increases and decreases. During the pulse-mode feature frame 608, the radar system 102 is configured to collect data across a portion of the active time 718 during which the frequency increases. After the active time 718, there may be a short-idle time 720 for which the radar system 102 is idle. The short-idle time 720 is shown to include a duration of the inactive radar frame 716-1. As an example, the short-idle time 720 may be less than approximately 250 μs. The radar duty cycle 304-3 is based on a ratio of the active time 718 to a total time associated with the active radar frame 714.

FIG. 7-3 illustrates an example burst-mode feature frame 610. In contrast to the pulse-mode feature frame 608, Q and R are not equal to each other for the burst-mode feature frame 610. Accordingly, a ratio of the quantity of active radar frames 714 to inactive radar frames 716 may be between approximately 0.05 and 0.9. Additionally, the inactive radar frames 716 are scheduled sequentially at an end of the burst-mode feature frame 610. In this way, the radar system 102 can be inactive for a longer period of time, as represented by the long-idle time 722. A duration of the long-idle time may be, for example, between approximately 250 μs and 10 ms. The active radar frames 714 are also structured differently such that radar data can be continuously collected from a start of the first active radar frame 714-1 to an end of a last active radar frame 714-Q (e.g., while the frequency ramp 724 increases and decreases in frequency).

Based on the framing structure 306, the power management module 220 can determine a time for which the radar system 102 is not actively collecting radar data. Based on this inactive time period, the power management module 220 can conserve power by adjusting an operational state of the radar system 102 and turning off one or more components of the transceiver 214, as further described with respect to FIG. 8.

Figure 8:
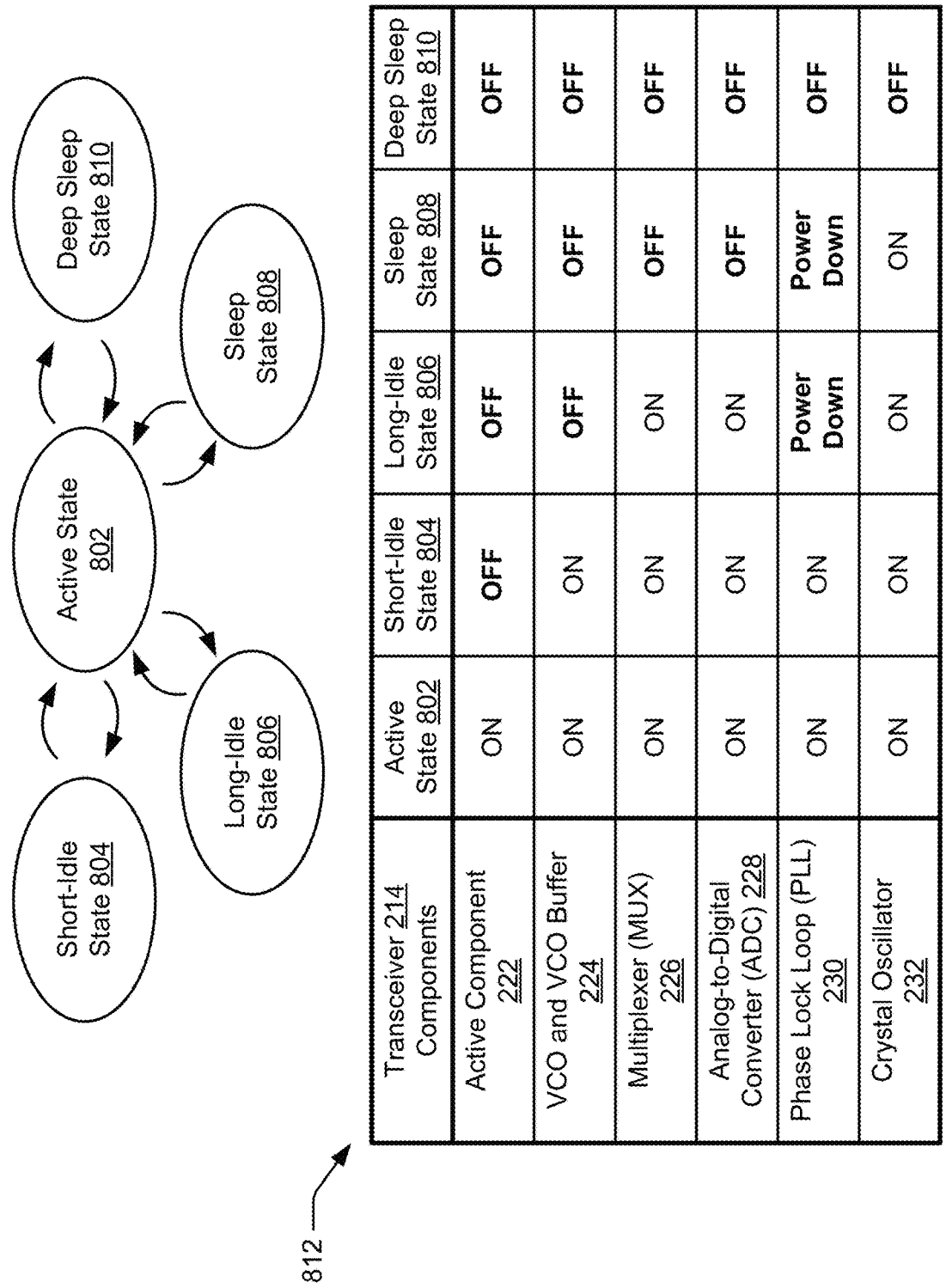
FIG. 8 illustrates example operational states of the radar system.

FIG. 8 illustrates example operational states of the radar system 102. The operational states include an active state 802, a short-idle state 804, a long-idle state 806, a sleep state 808, and a deep sleep state 810. As shown in table 812, the operational states are characterized by which components within the transceiver 214 are on, off, or powered down. The operational states are listed in order of decreasing power consumption, with the active state 802 consuming a largest amount of power and the deep sleep state 810 consuming a smallest amount of power. This decrease in power consumption occurs as more components of the transceiver 214 are turned off or powered down. A difference between a power down state and off-state of the phase lock loop 230 is that the phase lock loop 230 does not require reprogramming when switching from the power down state to the on-state and does require reprogramming when switching from the off-state to the on-state. Hence, the phase lock loop 230 can turn on quicker from a power down state compared to an off-state.

In the active state 802, the radar system 102 actively collects the radar data. As shown in the table 812, each of the components of the transceiver 214 are on, which causes the radar system 102 to consume a largest amount of power relative to the other operational states. For comparison purposes, let Xc represent the amount of power consumed during the active state 802, which may be on the order of a few milliwatts to hundreds of milliwatts depending on the power mode 302.

In contrast, the other operational states may occur if the radar system 102 is inactive. The power management module 220 can select one of the other operational states based on a duration of the inactivity, which can be determined based on the framing structure 306. For example, the short-idle state 804, the long-idle state 806, the sleep state 808, and the deep-sleep state 810 can be respectively activated during the short-idle time 720, the long-idle time 722, the sleep time 712, and the deep sleep time 706, which are described in FIGS. 7-1, 7-2, and 7-3. In relationship to the active state 802, the power consumed via the short-idle state 804, the long-idle state 806, the sleep state 808, and the deep sleep state 810 may be, for example, approximately 60% Xc, 10% Xc, 5% Xc, and 0% Xc, respectively. The power management module 220 can change the operational state of the radar system 102 by writing appropriate bits to a register, which controls a state of the components within the transceiver 214.

To switch from one of the inactive operational states to the active state 802, there may be some amount of setup or settling time involved before the radar system 102 can actively transmit or receive the radar signals and collect the radar data. Accordingly, the power management module 220 can also take into account a turn-on time associated with transitioning from one of the idle operational states to the active state 802 to select an appropriate idle operational state. This turn-on time is dependent upon which components in the transceiver 214 are turned-off or powered down in the idle operational state. The components in the transceiver 214 are listed in order of increasing turn-on times with the active component 222 associated with a shortest turn-on time (e.g., less than 20 μs) and the crystal oscillator associated with a longest turn-on time (e.g., more than 100 μs). Knowing these turn-on times, the power management module 220 can control the timing associated with switching between the idle and active operational states, such that power is conserved without delaying the collection of the radar data.

Example Methods

Figure 9:
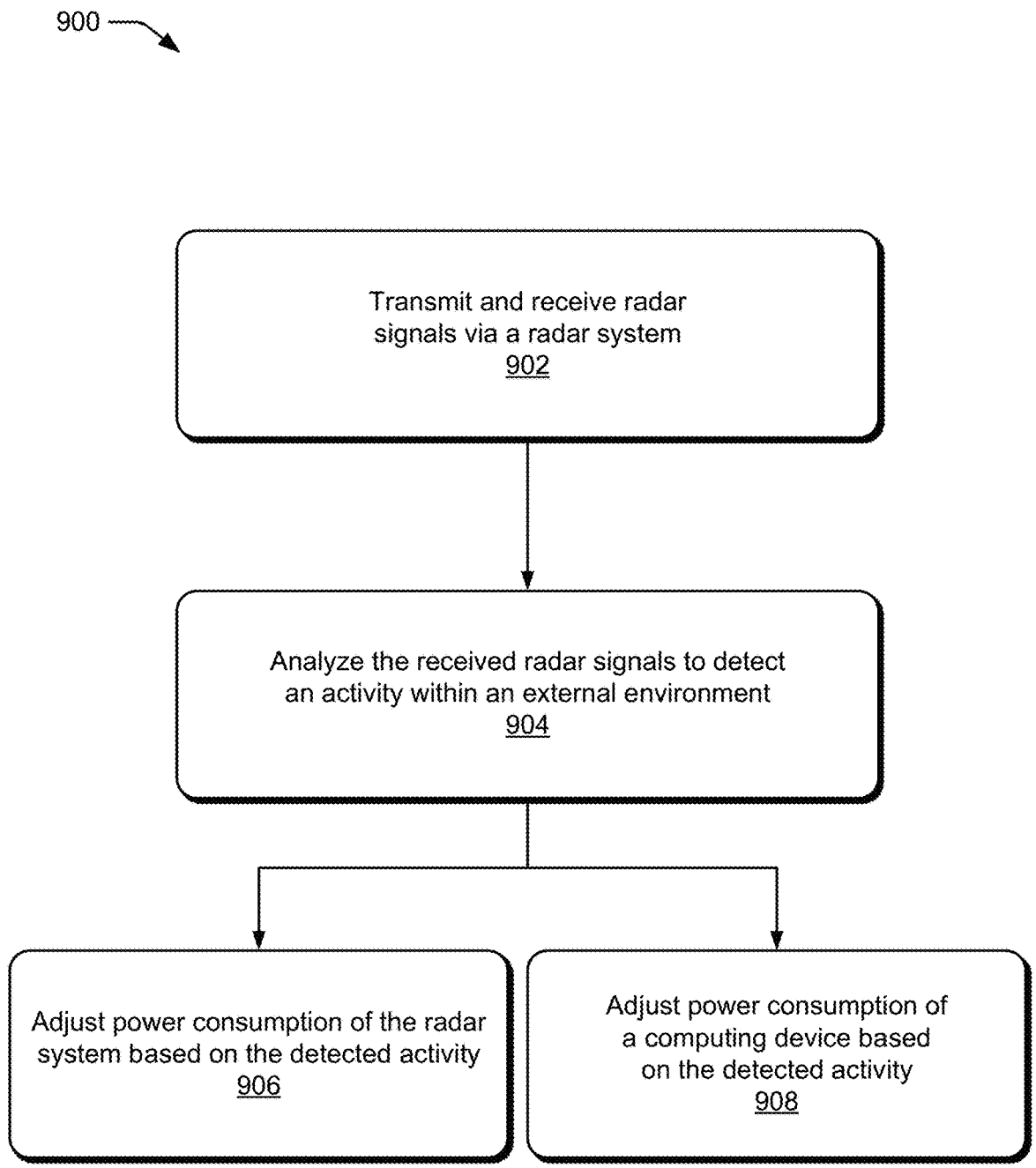
FIG. 9 illustrates an example method for operating a low-power radar and performing power management using a low-power radar.

FIG. 9 depicts example method 900 for operating a low-power radar and power management using a low-power radar. Method 900 is shown as a set of operations (or acts) performed but not necessarily limited to the order or combinations in which the operations are illustrated. Further, any of one or more of the operations may be repeated, combined, reorganized, or linked to provide a wide array of additional and/or alternate methods. In portions of the following discussion, reference may be made to the environments 106, 110, or 112 of FIG. 1 and entities detailed in FIGS. 2-1 and 2-2, reference to which is made for example only. The techniques are not limited to performance by one entity or multiple entities operating on one device.

At 902, radar signals are transmitted and received via a radar system. For example, the radar system 102 can transmit and receive radar signals using the transceiver 214 and the antenna array 212. The power management module 220 may generate a framing structure 306 to specify a modulation type, bandwidth, frequency, transmit power 308, or timing of the radar signals.

At 904, the received radar signals are processed to detect an activity within an external environment. The processor 216 or the application processor 202, for example, may process the received radar signals to detect (e.g., determine or identify) an activity within an external environment. The detected activity may be associated with any type of change (or lack of change) within the example environments 106-1, 106-2, 110-1, 110-2, 112-1, or 112-2 in FIG. 1. Example activities may include motion or the lack of motion, appearance or disappearance of a user 108, a user 108 moving into or out of a designated region (e.g., a region defined by range, azimuth, or elevation), a change in velocity of a motion associated with the user 108, or a change in reflected signal strength (e.g., due to changes in radar cross section), and so forth.

At 906, power consumption of the radar system is adjusted based on the detected activity. For example, the power management module 220 adjusts the power consumption of the radar system 102 by causing the radar system 102 to operate according to different power modes 302. The power modes 302 may utilize different duty cycles 304, framing structures 306, transmit powers 308, radar pipelines 310, or hardware 312. The power management module 220 selects the power mode 302 such that the radar system 102 conserves power and can detect different types of activity that are likely to occur within the external environment (e.g., a user 108 approaching the computing device 104 or the user 108 performing a gesture).

At 908, power consumption of a computing device is adjusted based on the detected activity. For example, the power management module 220 may switch an operational state of one or more components within the computing device between an on-state or an off-state. These components may include a global positioning system, a wireless communication transceiver, a display, a speaker, a camera, a gyroscope, an accelerometer, and so forth. If the radar system 102 is embedded within the computing device 104, the power can also be adjusted by adjusting the power consumption of the radar system 102, as described at 906.

Example Computing System

Figure 10:
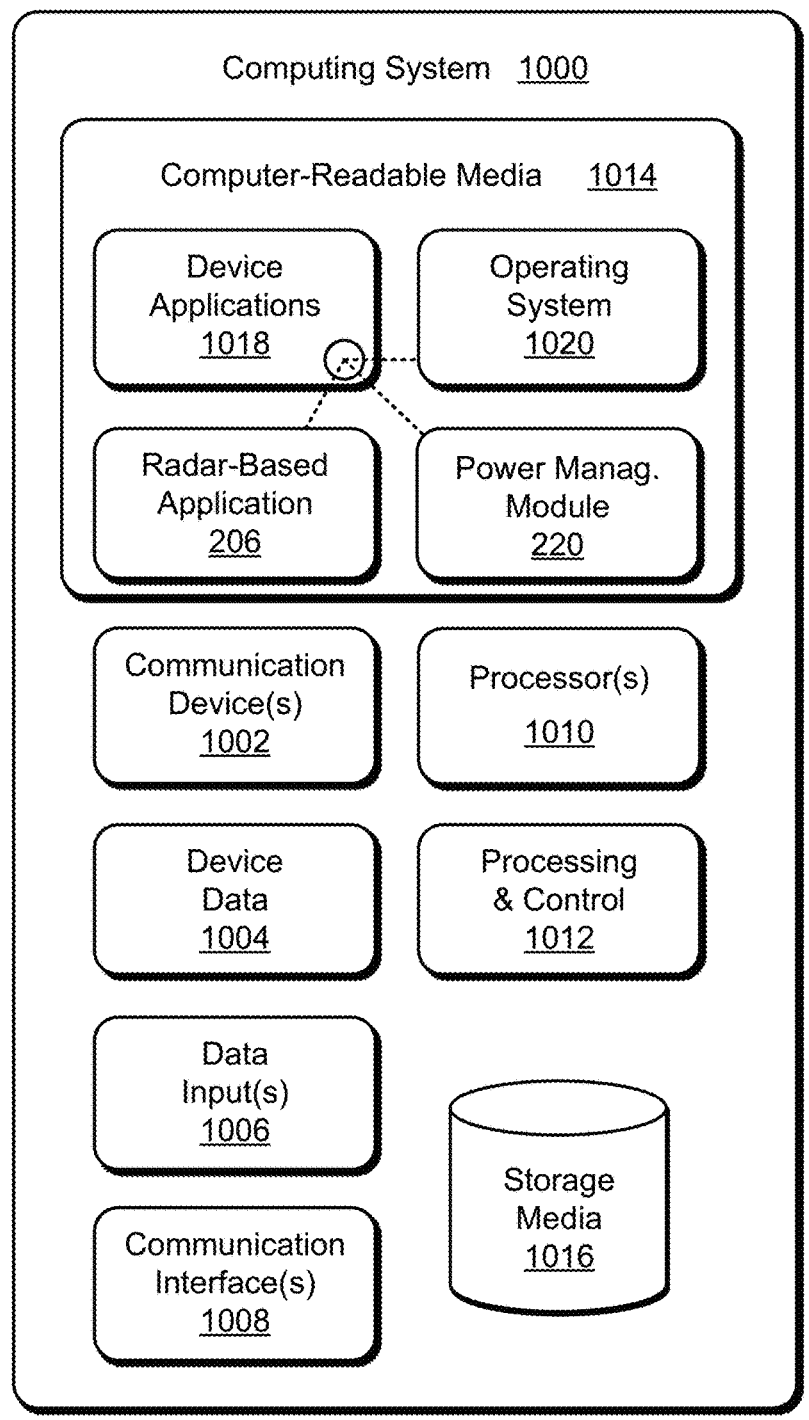
FIG. 10 illustrates an example computing system embodying, or in which techniques may be implemented that enable power management using a low-power radar.

FIG. 10 illustrates various components of example computing system 1000 that can be implemented as any type of client, server, and/or computing device as described with reference to the previous FIGS. 1 and 2 to implement power management using a low-power radar.

The computing system 1000 includes communication devices 1002 that enable wired and/or wireless communication of device data 1004 (e.g., received data, data that is being received, data scheduled for broadcast, data packets of the data). The device data 1004 or other device content can include configuration settings of the device, media content stored on the device, and/or information associated with a user of the device. Media content stored on the computing system 1000 can include any type of audio, video, and/or image data. The computing system 1000 includes one or more data inputs 1006 via which any type of data, media content, and/or inputs can be received, such as human utterances, turn-on times associated with components of the transceiver 214, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, power management using a low-power radar. Alternatively or in addition, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, or EEPROM), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers to implement power management using a low-power radar. In this example, device applications 1018 include the radar-based application 206 and the power management module 220.

CONCLUSION

Although techniques using, and apparatuses including, power management using a low-power radar have been described in language specific to features and/or methods, it is to be understood that the subject of the appended claims is not necessarily limited to the specific features or methods described. Rather, the specific features and methods are disclosed as example implementations of power management using a low-power radar.

What is claimed is:

1. An apparatus comprising:
multiple components respectively configured to selectively operate according to an on-state or an off-state, the off-state consuming less power than the on-state; and
a radar system configured to:
transmit and receive radar signals;
process the received radar signals to detect a user within an external environment;
monitor, based on the received radar signals, a distance between the radar system and the user; and
responsive to the distance between the radar system and the user changing, adjust power consumption of the apparatus by switching states of one or more components of the multiple components between the on-state and the off-state, the multiple components being external to the radar system.

2. The apparatus of claim 1, wherein:
the multiple components include a camera, the camera configured to capture an image of a portion of the external environment during the on-state; and
the radar system is configured to adjust the power consumption of the apparatus by switching a state of the camera between the on-state and the off-state.

3. The apparatus of claim 1, wherein:
the multiple components include a wireless communication transceiver, the wireless communication transceiver configured to transmit and receive wireless communication signals during the on-state; and
the radar system is configured to adjust the power consumption of the apparatus by switching a state of the wireless communication transceiver between the on-state and the off-state.

4. The apparatus of claim 1, wherein:
the multiple components include a gyroscope, the gyroscope configured to determine an orientation of the apparatus during the on-state; and
the radar system is configured to adjust the power consumption of the apparatus by switching a state of the gyroscope between the on-state and the off-state.

5. The apparatus of claim 1, wherein the apparatus comprises a smartphone.

6. The apparatus of claim 1, wherein the radar system is configured to increase the power consumption of the apparatus by switching a state of at least one component of the multiple components from the off-state to the on-state before the user physically touches the apparatus or voices a verbal command to the apparatus.

7. The apparatus of claim 1, wherein the radar system is configured to:
detect at least one activity associated with the user, the at least one activity comprising one or more of the following:

a change in a presence of the user;
a change in a type of motion performed by the user;
a change in the distance to the user;
a change in a velocity of a motion performed by the user; or
a change in a reflected signal strength associated with the user; and
adjust the power consumption of the apparatus responsive to detecting the at least one activity.

8. The apparatus of claim 1, wherein:
the multiple components include a display, the display configured to present visual content to the user during the on-state; and
the radar system is configured to:
cause a state of the display to be in the off-state responsive to the distance being greater than a predetermined distance; and
increase the power consumption of the apparatus by switching the state of the display from the off-state to the on-state responsive to the distance being less than or equal to the predetermined distance.

9. The apparatus of claim 8, wherein:
the radar system is configured to decrease the power consumption of the apparatus by switching the state of the display from the on-state to the off-state responsive to the distance being greater than the predetermined distance.

10. The apparatus of claim 1, wherein:
the radar system is configured to gradually increase the power consumption of the apparatus as the user approaches the apparatus; and
the radar system is configured to gradually decrease the power consumption of the apparatus as the user moves away from the apparatus.

11. The apparatus of claim 1, wherein:
the multiple components include a speaker, the speaker configured to present audio content to the user during the on-state; and
the radar system is configured to:
cause a state of the speaker to be in the on-state responsive to the distance being less than a predetermined distance; and
decrease the power consumption of the apparatus by switching the state of the speaker from the on-state to the off-state responsive to the distance being greater than the predetermined distance.

12. The apparatus of claim 1, wherein:
the radar system is configured to adjust the power consumption of the apparatus by adjusting power consumption of the radar system.

13. The apparatus of claim 12, wherein the radar system includes a power management module, the power management module configured to cause the radar system to dynamically adjust the power consumption of the radar system to detect different activities associated with the user.

14. The apparatus of claim 12, wherein the radar system is configured to reduce power consumption of the radar system during inactive time periods by switching respective operations of one or more internal components within the radar system from the on-state to the off-state.

15. A method comprising:
transmitting and receiving radar signals via a radar system;
processing the received radar signals to detect a user within an external environment;
monitoring, based on the received radar signals, a distance between the radar system and the user; and
responsive to the distance changing, adjusting power consumption of a computing device by switching states of one or more components of the computing device between an on-state and an off-state, the off-state consuming less power than the on-state, the one or more components being external to the radar system.

16. The method of claim 15, wherein the one or more components comprise at least one of the following:
a global positioning system;
a wireless communication transceiver;
a display;
a speaker;
a camera;
a gyroscope; or
an accelerometer.

17. The method of claim 15, wherein the adjusting of the power consumption comprises:
responsive to the distance between the user and the computing device increasing over time, decreasing the power consumption of the computing device by increasing a quantity of the components that are in the off-state; and
responsive to the distance between the user and the computing device decreasing over time, increasing the power consumption of the computing device by decreasing the quantity of the components that are in the off-state.

18. The method of claim 15, further comprising determining a direction of motion associated with the user based on the received radar signals,
wherein the adjusting of the power consumption comprises increasing the power consumption responsive to the direction of the motion indicating at least a portion of the user is approaching the computing device.

19. The method of claim 15, further comprising causing the radar system to operate at a low-power mode while transmitting and receiving the radar signals.

20. The method of claim 15, wherein the computing device comprises a smartphone.

* * * * *